United States Patent
Yamada et al.

[19]

[11] Patent Number: 5,825,433
[45] Date of Patent: Oct. 20, 1998

[54] VIDEO MIXING APPARATUS

[75] Inventors: Yoshiki Yamada, Kitano; Norio Suzuki, Neyagawa, both of Japan

[73] Assignee: Matsushita Electric Industrial Co., Ltd., Osaka, Japan

[21] Appl. No.: 568,672

[22] Filed: Dec. 7, 1995

[30] Foreign Application Priority Data

Dec. 7, 1994 [JP] Japan .................................. 6-331035

[51] Int. Cl.$^6$ .......................... H04N 5/272; H04N 5/273
[52] U.S. Cl. ......................... 348/584; 348/585; 348/590; 348/591; 348/586; 348/587; 348/593; 348/594
[58] Field of Search .................................. 348/584, 585, 348/590, 591, 586, 587, 593, 594; 438/595, 596; H04N 5/272, 5/273

[56] References Cited

U.S. PATENT DOCUMENTS

| | | |
|---|---|---|
| 4,851,912 | 7/1989 | Jackson et al. . |
| 5,305,107 | 4/1994 | Gale et al. . |
| 5,353,068 | 10/1994 | Moriwake ................................ 348/585 |
| 5,428,401 | 6/1995 | Hinson ..................................... 348/586 |

FOREIGN PATENT DOCUMENTS

| | | |
|---|---|---|
| 0 486 468 | 5/1992 | European Pat. Off. . |
| 0 586 140 | 3/1994 | European Pat. Off. . |
| 5-30350 | 5/1993 | Japan . |
| 6-86163 | 3/1994 | Japan . |

OTHER PUBLICATIONS

Y. Oda, "Key Process Technique In Postproduction", Jul. 1994, (8 pages).
European Search Report dated Feb. 4, 1997.

*Primary Examiner*—John K. Peng
*Assistant Examiner*—Vivck Srivastava
*Attorney, Agent, or Firm*—Ratner & Prestia

[57] ABSTRACT

A video mixing apparatus for mixing a first video signal and a second video signal in accordance with a first key signal and a second key signal. The video mixing apparatus includes a key signal mixer for receiving the first and second key signals and generating and outputting a third key signal and a fourth key signal, wherein a level $K_1$ of the first key signal, a level $K_2$ of the second key signal, a level $K_p$ of the third key signal, and a level $K_m$ of the fourth key signal satisfy the relationships:

$$K_p = K_2 - K_1 K_2,$$

and $$K_m = K_1 + K_2 - K_1 K_2;$$

a key signal division section for receiving the third and fourth key signals and generating and outputting a fifth key signal, wherein a level $K_g$ of the fifth key signal satisfies the relationship:

$$K_g = K_p / K_m;$$

and a first video signal mixer for receiving the first and second video signals and the fifth key signal and generating and outputting a third video signal by mixing the first and second video signals at a mix ratio which is in accordance with the fifth key signal.

19 Claims, 16 Drawing Sheets

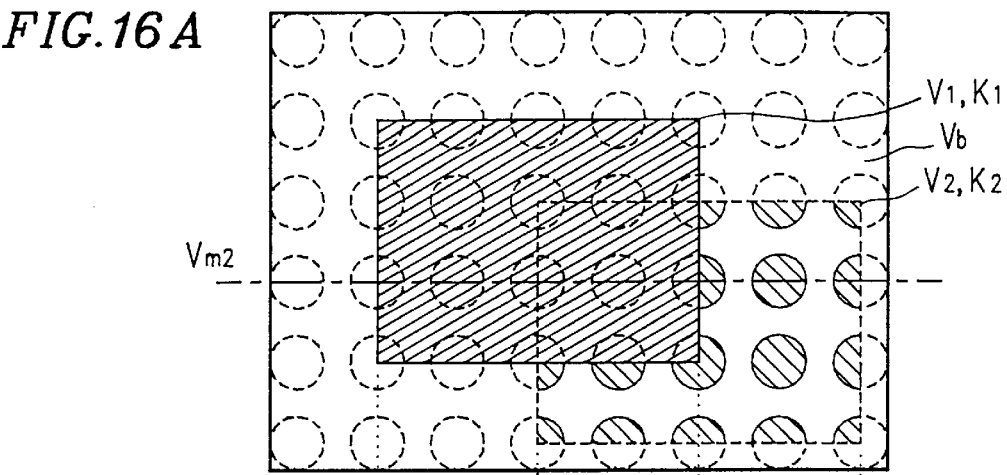
FIG.16A
FIG.16B K1 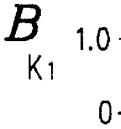
FIG.16C K2 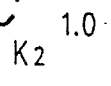
FIG.16D W2 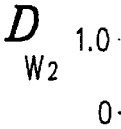
FIG.16E Kw2 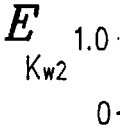
FIG.16F Kp 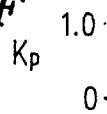
FIG.16G Km 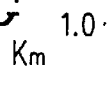
FIG.16H Kg 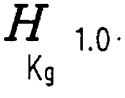
FIG.16I Vm1 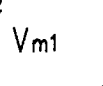
FIG.16J Vm2 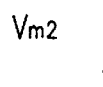

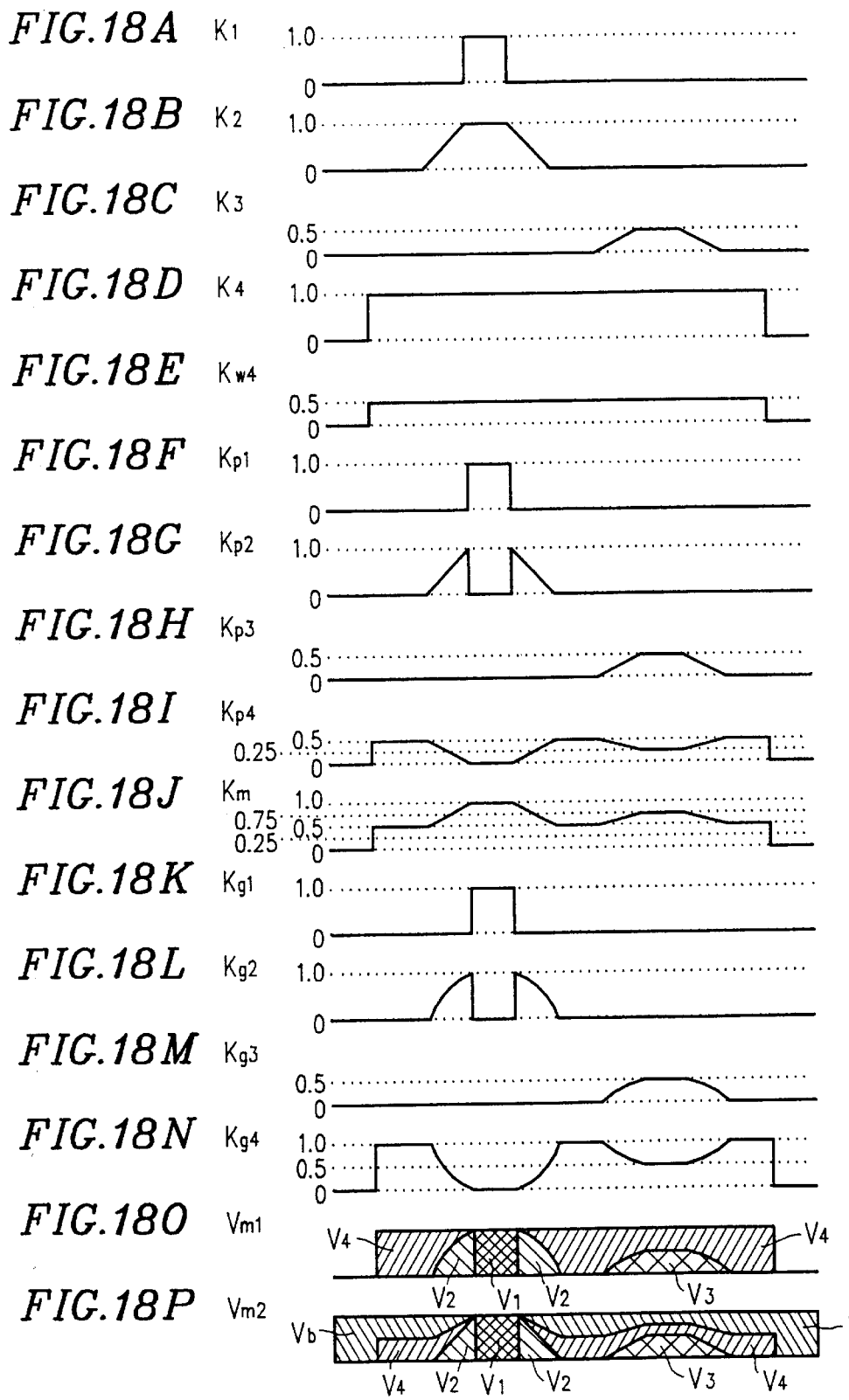

VIDEO MIXING APPARATUS

BACKGROUND OF THE INVENTION

1. Field of the Invention

The present invention relates to a video mixing apparatus for performing a video mixing process for a plurality of input video signals in accordance with a plurality of key signals and outputting a mixed video signal.

2. Description of the Related Art

An apparatus is known which, in accordance with two or more input key signals, mixes a video in which input video signals corresponding to the respective key signals are inserted into a background video signal (i.e., a video signal representing a background image). Such a video mixing apparatus includes a video signal mixer for performing the above-mentioned key mixing process for two video signals. As used herein, a "video signal" means a signal representing an image. Accordingly, mixing of images is performed by processing video signals representing the images.

Many conventional video mixing apparatuses include a plurality of video signal mixers interconnected in series, the number of video signal mixers being in accordance with the number of input video signals (e.g., Japanese Patent Publication No. 5-30350).

In such a video mixing apparatus including a plurality of video signal mixers provided in series, a background video signal is input to a first video signal mixer, and a plurality of video signal mixers for mixing two video signals are connected in series. This results in a problem in that the background video signal is led through a plurality of video signal mixers, thus degrading the video transfer characteristics. An input video signal and a background video signal that were mixed in a given stage are not distinguishable when provided to a subsequent stage as an input video signal for further mix. Therefore, after a plurality of input video signals are mixed at a predetermined mix ratio, it is impossible to employ this method for inserting the resultant mixed video into a background video in order to generate a mixed-video signal.

In order to avoid circuit configurations in which a plurality of video signal mixers having two inputs each are interconnected in series, a video mixing apparatus has been proposed which is capable of mixing a plurality of input video signals with one another and mixing a plurality of key signals with one another in advance (e.g., Japanese Patent Publication No. 5-30350).

The above-mentioned video mixing apparatus, in which a plurality of input video signals are mixed with one another and a plurality of key signals are mixed with one another in advance, can solve the problem of background video signals being influenced by the deterioration of video transfer characteristics. However, because there exists a multiple interaction of linear key characteristics, non-linear key characteristics may result. Boundaries of images may vary due to such non-linear characteristics. Specifically, when mixing videos in the last video signal mixer, unnecessary video signals may be mixed in the boundaries therebetween ("KEY PROCESS TECHNIQUE IN POSTPRODUCTION", Seibundo Shinkosha, CHROMA, July 1994, pp. 19–20).

In order to prevent unnecessary video signals from being mixed, the control characteristics of a video signal mixer for mixing input video signals with one another are required to have on-off characteristics such that the input video signals are selected exclusively in response to each input key signal. However, if the video signal mix between input video signals is controlled in an on-off manner, only one input video signal is exclusively selected when mixing input video signals. Such a configuration cannot handle a situation where a plurality of input key signals may be at an intermediate level simultaneously. Moreover, as in the case of the above-described configuration in which a plurality of video signal mixers interconnected in series, it is impossible to mix a plurality of input video signals at a predetermined mix ratio and then insert a resultant mixed video into a background video in order to obtain a further mixed video signal.

SUMMARY OF THE INVENTION

A video mixing apparatus for mixing a first video signal and a second video signal in accordance with a first key signal and a second key signal according to the present invention includes: a key signal mixer for receiving the first and second key signals and generating and outputting a third key signal and a fourth key signal, wherein a level $K_1$ of the first key signal, a level $K_2$ of the second key signal, a level $K_3$ of the third key signal, and a level $K_4$ of the fourth key signal satisfy the relationships:

$$K_3 = K_2 - K_1 K_2,$$

and $$K_4 = K_1 + K_2 - K_1 K_2;$$

a key signal division section for receiving the third and fourth key signals and generating and outputting a fifth key signal, wherein a level $K_5$ of the fifth key signal satisfies the relationship:

$$K_5 = K_3 / K_4;$$

and a first video signal mixer for receiving the first and second video signals and the fifth key signal and generating and outputting a third video signal by mixing the first and second video signals at a mix ratio which is in accordance with the fifth key signal.

In one embodiment of the invention, a level $V_1$ of the first video signal, a level $V_2$ of the second video signal, and a level $V_3$ of the third video signal satisfy the relationship:

$$V_3 = (1 - K_5) V_1 + K_5 \cdot V_2.$$

In another embodiment of the invention, the video mixing apparatus further includes a second video signal mixer for receiving the third and fourth video signals and the fourth key signal and generating and outputting a fifth video signal by mixing the third and fourth video signals at a mix ratio which is in accordance with the fourth key signal.

In still another embodiment of the invention, a level $V_4$ of the fourth video signal and a level $V_5$ of the fifth video signal satisfy the relationship:

$$V_5 = (1 - K_4) V_4 + K_4 \cdot V_3.$$

In still another embodiment of the invention, the video mixing apparatus further includes a key signal division section for receiving the first and fourth key signals and generating and outputting a sixth key signal, wherein a level $K_6$ of the sixth key signal satisfies the relationship:

$$K_6 = K_1 / K_4,$$

and the first video signal mixer further receives the sixth key signal and generates and outputs a third video signal by mixing the first and second video signals at a mix ratio which is in accordance with the fifth and sixth key signals.

In still another embodiment of the invention, a level $V_1$ of the first video signal, a level $V_2$ of the second video signal, and a level $V_3$ of the third video signal satisfy the relationship:

$$V_3 = K_6 \cdot V_1 + K_5 \cdot V_2.$$

Alternatively, a video mixing apparatus for mixing a first video signal and a second video signal in accordance with a first key signal, a second key signal, and a priority key signal according to the present invention includes: a key signal mixer for receiving the first key signal, the second key signal, and the priority key signal and generating and outputting a third key signal and a fourth key signal, wherein a level $K_1$ of the first key signal, a level $K_2$ of the second key signal, a level $K_3$ of the third key signal, a level $K_4$ of the fourth key signal, and a level $K_p$ of the priority key signal satisfy the relationships:

$$K_3 = K_2 - K_p K_1 K_2,$$

and $$K_4 = K_1 + K_2 - K_1 K_2;$$

a key signal division section for receiving the third and fourth key signals and generating and outputting a fifth key signal, wherein a level $K_5$ of the fifth key signal satisfies the relationship:

$$K_5 = K_3 / K_4;$$

and a first video signal mixer for receiving the first and second video signals and the fifth key signal and generating and outputting a third video signal by mixing the first and second video signals at a mix ratio which is in accordance with the fifth key signal.

In one embodiment of the invention, a level $V_1$ of the first video signal, a level $V_2$ of the second video signal, and a level $V_3$ of the third video signal satisfy the relationship:

$$V_3 = (1 - K_5) V_1 + K_5 \cdot V_2.$$

In another embodiment of the invention, the video mixing apparatus further includes a second video signal mixer for receiving the third and fourth video signals and the fourth key signal and generating and outputting a fifth video signal by mixing the third and fourth video signals at a mix ratio which is in accordance with the fourth key signal.

In still another embodiment of the invention, a level $V_4$ of the fourth video signal and a level $V_5$ of the fifth video signal satisfy the relationship:

$$V_5 = (1 - K_4) V_4 + K_4 \cdot V_3.$$

In still another embodiment of the invention, the video mixing apparatus further includes a key signal division section for receiving the first and fourth key signals and generating and outputting a sixth key signal, wherein a level $K_6$ of the sixth key signal satisfies the relationship:

$$K_6 = K_1 / K_4,$$

and the first video signal mixer further receives the sixth key signal and generates and outputs a third video signal by mixing the first and second video signals at a mix ratio which is in accordance with the fifth and sixth key signals.

In still another embodiment of the invention, a level $V_1$ of the first video signal, a level $V_2$ of the second video signal, and a level $V_3$ of the third video signal satisfy the relationship:

$$V_3 = K_6 \cdot V_1 + K_5 \cdot V_2.$$

Alternatively, a video mixing apparatus for mixing $1^{st}$ to $N^{th}$ video signals in accordance with $1^{st}$ to $N^{th}$ key signals according to the present invention includes:

a key signal mixer for receiving the $1^{st}$ to $N^{th}$ key signals and generating and outputting a $(N+1)^{th}$ to $2N^{th}$ key signals and a mixed key signal, wherein a level $K_1$ of the $1^{st}$ key signal, a level $K_2$ of the $2^{nd}$ key signal, . . . , and a level $K_{2N}$ of the $2N^{th}$ key signal satisfy the relationship:

$$K_i = K_{i-N} \cdot (1 - K_{i-N-1}) \cdot (1 - K_{i-N-2}) \cdot \ldots \cdot (1 - K_1)$$

for $i = (N+1)$ to $2N$ (where $K_0 = 0$), and a level $K_m$ of the mixed key signal satisfies the relationship:

$$K_m = 1 - (1 - K_1) \cdot (1 - K_2) \cdot \ldots \cdot (1 - K_N);$$

a key signal division section for receiving the $(N+1)^{th}$ to $2N^{th}$ key signals and the mixed key signal and generating and outputting $(2N+1)^{th}$ to $3N^{th}$ key signals, wherein a level $K_{2N+1}$ of the $(2N+1)^{th}$ key signal, a level $K_{2N+2}$ of the $(2N+2)^{th}$ key signal, . . . , and a level $K_{3N}$ of the $3N^{th}$ key signal satisfy the relationship:

$$K_i = K_{i-N} / K_m$$

for $i = (2N+1)$ to $3N$; and a first video signal mixer for receiving the $1^{st}$ to $N^{th}$ video signals and the $(2N+1)^{th}$ to $3N^{th}$ key signals and generating and outputting a first output video signal by mixing the $1^{st}$ to $N^{th}$ video signals at a mix ratio which is in accordance with the $(2N+1)$th to $3N^{th}$ key signals, wherein N is an integer equal to or greater than two.

In one embodiment of the invention, a level $V_1$ of the $1^{st}$ video signal, a level $V_2$ of the $2^{nd}$ video signal, . . . , and a level $V_N$ of the $N^{th}$ video signal satisfy the relationship:

$$V_{m1} = V_1 \cdot (K_{2N+1}) + V_2 \cdot (K_{2N+2}) + \ldots + V_3 \cdot (K_{3N}).$$

In another embodiment of the invention, the video mixing apparatus further includes a second video signal mixer for receiving the first output video signal, the $(N+1)^{th}$ video signal, and the mixed key signal and generating and outputting a second output video signal by mixing the first output video signal and the $(N+1)^{th}$ video signal at a mix ratio which is in accordance with the mixed key signal, wherein N is an integer equal to or greater than three.

In still another embodiment of the invention, a level $V_{N+1}$ of the $(N+1)^{th}$ video signal and a level $V_{m2}$ of the second video signal satisfy the relationship:

$$V_{m2} = K_m \cdot V_{m1} + (1 - K_m) \cdot V_{N+1}.$$

In still another embodiment of the invention, the video mixing apparatus further includes a key signal weighting unit for varying at least one of the key signals depending on a display location on a display, wherein the key signal mixer receives at least one of the weighted key signals output from the key signal weighting unit.

In still another embodiment of the invention, the video mixing apparatus further includes a key signal weighting unit for varying at least one of the key signals depending on a display location on a display, wherein the key signal mixer receives at least one of the weighted key signals output from the key signal weighting unit.

In still another embodiment of the invention, the video mixing apparatus further includes a key signal weighting unit for varying at least one of the key signals depending on a display location on a display, wherein the key signal mixer receives at least one of the weighted key signals output from the key signal weighting unit.

A video mixing apparatus according to the present invention is capable of adjusting the levels of a plurality of input key signals even when the input key signals are all at levels which are not the zero level, thus performing a mixing of the plurality of input video signals. By previously dividing each priority key signal by a mixed key signal at a key signal division section, non-linear characteristics are avoided which would result from multiple interaction between input key signals in a video signal mixer for performing a video mixing process for input video signals and a video signal mixer for performing a video signal mix into a background video signal. As a result, it becomes possible to input a plurality of input video signals to the apparatus so as to generate one mixed video signal in accordance with the respective input key signals. In the case where a plurality of key signals are at intermediate levels simultaneously, the present invention makes it possible to provide a mixed video signal in which video signals are visibly overlaid on one another against a background video signal.

Thus, the invention described herein makes possible the advantages of (1) providing a video mixing apparatus for performing a video mixing process for a plurality of input video signals in accordance with a plurality of input key signals and outputting a mixed video signal, in which a background video signal is led through only one video signal mixer, and the desired mixing of video signals is possible even in the case where a plurality of input key signals are simultaneously at intermediate levels; (2) providing a video mixing apparatus which is, in addition to the features in (1) above, capable of previously mixing two input video signals at a predetermined mix ratio and thereafter inserting the resultant pre-mixed video signal into a background video signal; and (3) providing a video mixing apparatus which is capable of modifying the level of the input video signal with the weighting pattern signal before mixing the input video signal with other video signals.

These and other advantages of the present invention will become apparent to those skilled in the art upon reading and understanding the following detailed description with reference to the accompanying figures.

BRIEF DESCRIPTION OF THE DRAWINGS

FIG. 16A is a diagram showing a state in which an image and its dropshadow are mixed with a background image.

FIG. 16B is a diagram showing the level of an input key signal $K_1$.

FIG. 16C is a diagram showing the level of an input key signal $K_2$.

FIG. 16D is a diagram showing the level of a weighting pattern signal $W_2$.

FIG. 16E is a diagram showing the level of an output signal $K_{w2}$.

FIG. 16F is a diagram showing the level of a priority key signal $K_p$.

FIG. 16G is a diagram showing the level of a mixed key signal $K_m$.

FIG. 16H is a diagram showing the level of a video gain control signal $K_g$.

FIG. 16I is a diagram showing the level of a mixed video signal $V_{m1}$.

FIG. 16J is a diagram showing the level of a mixed video signal $V_{m2}$.

FIG. 18A is a diagram showing the level of an input key signal $K_1$.

FIG. 18B is a diagram showing the level of an input key signal $K_2$.

FIG. 18C is a diagram showing the level of an input key signal $K_3$.

FIG. 18D is a diagram showing the level of an input key signal $K_4$.

FIG. 18E is a diagram showing the level of a weighting pattern signal $K_{w4}$.

FIG. 18F is a diagram showing the level of a priority key signal $K_{p1}$.

FIG. 18G is a diagram showing the level of a priority key signal $K_{p2}$.

FIG. 18H is a diagram showing the level of a priority key signal $K_{p3}$.

FIG. 18I is a diagram showing the level of a priority key signal $K_{p4}$.

FIG. 18J is a diagram showing the level of a mixed key signal $K_m$.

FIG. 18K is a diagram showing the level of a video gain control signal $K_{g1}$.

FIG. 18L is a diagram showing the level of a video gain control signal $K_{g2}$.

FIG. 18M is a diagram showing the level of a video gain control signal $K_{g3}$.

FIG. 18N is a diagram showing the level of a video gain control signal $K_{g4}$.

FIG. 18O is a diagram showing the level of a mixed video signal $V_{m1}$.

FIG. 18P is a diagram showing the level of a mixed video signal $V_{m2}$.

DESCRIPTION OF THE PREFERRED EMBODIMENTS

Hereinafter, the video mixing apparatus according to the present invention will be described by way of examples, with reference to the accompanying figures. Like constituent elements will be denoted by like numerals.

(Example 1)

Figure 1:
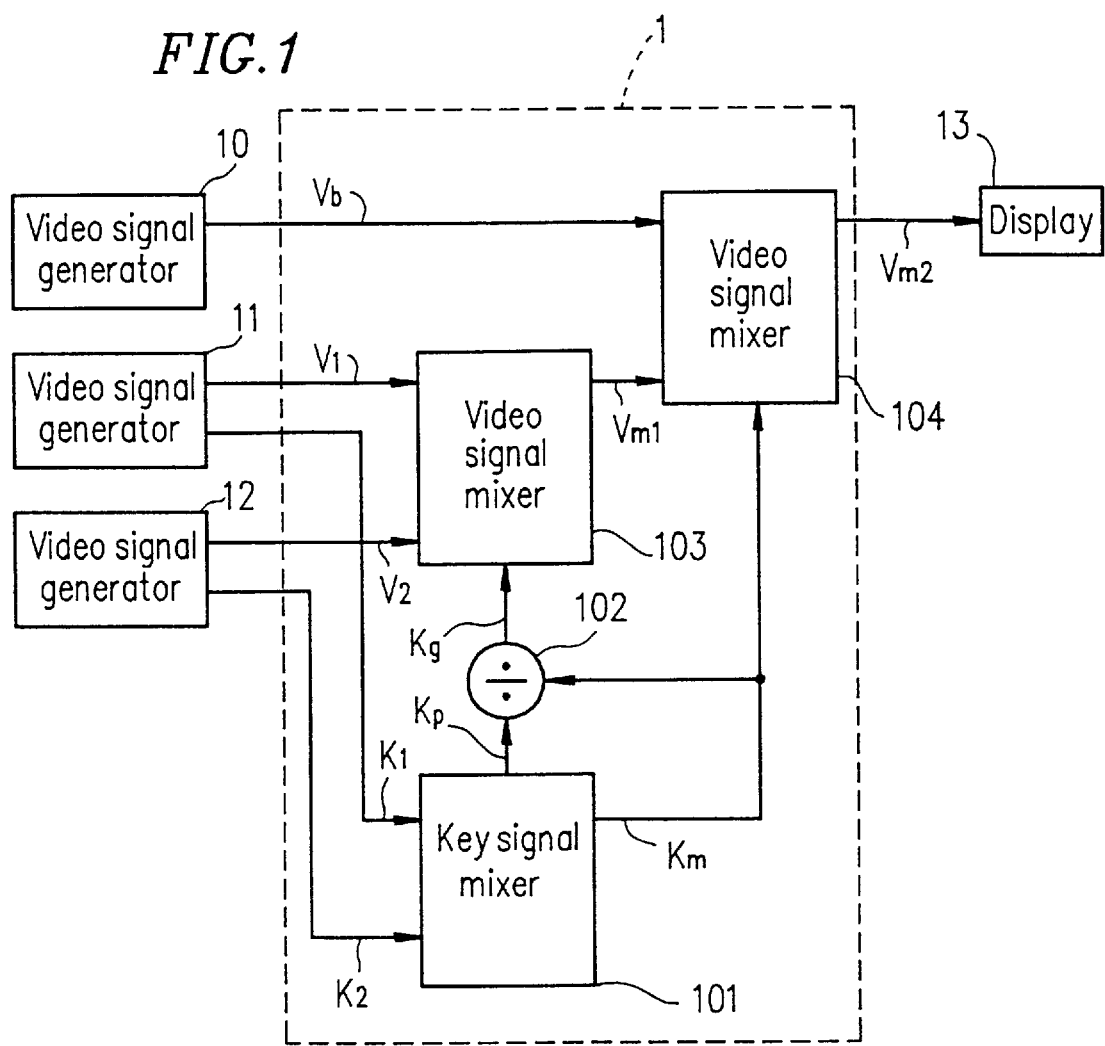
FIG. 1 is a block diagram showing a video mixing apparatus 1 according to Example 1 of the present invention.

FIG. 1 is a block diagram showing a video mixing apparatus 1 according to Example 1 of the present invention. The video mixing apparatus 1 receives two input video signals $V_1$ and $V_2$ and their corresponding input key signal $K_1$ and $K_2$ from video signal generators 11 and 12, respectively. The video mixing apparatus 1 mixes the input video signals $V_1$ and $V_2$ and a background video signal $V_b$, and outputs a resultant mixed video signal $V_{m2}$ to a display 13. The mixing of the input video signals $V_1$ and $V_2$ is performed in accordance with input key signals $K_1$ and $K_2$. Herein, "mixing of video signals" is defined as performing summation of the multiplication of a plurality of input video signals and input key signals corresponding to the key signals.

The video signal generator 11 supplies the input video signal $V_1$ and the input key signal $K_1$ to the video mixing apparatus 1. The input video signal $V_1$ is a video signal representing characters and/or graphics, etc. Hereinafter, the reference numeral "$V_1$", when employed within equations, represents the level of the input video signal $V_1$. Similarly, the reference numeral "$K_1$", when employed within equations, represents the level of the input key signal $K_1$. Hereinafter, the other reference numerals, when employed within equations, all represent the levels of the signals they indicate.

The present invention employs a luminance signal Y and color difference signals Cb and Cr as video signals, which are generally referred to as "component signals". In this specification, a "level of video signal" means values of luminance signal Y and color difference signals Cb and Cr. When these signals are analog signals, the values are represented by respective voltage levels of the analog signals. On the contrary, when these signals are digital signals, the values are represented by respective numerical expression using, for example, binary notation of the digital signals.

Here, the luminance signal Y is normalized so as to represent black level at zero level, and white level at "+1.0" level. Color difference signals Cb and Cr are normalized so as to represent maximum level at "+1.0" level, minimum level at "−1.0", and absence of the signal components at zero level. It is noted, however, that the video signal is not limited to the component signal in order to implement the video mixing apparatus of the present invention. For example, a composite signal or an RGB signal may be used as the video signal.

A "key signal" is a signal for controlling gain, which represents transfer gain of the video signal. In this specification, "key signal level" ranges from 0.0 to +1.0. The key signal level of 1.0 means that the transfer gain is 1.0, where the output video signal level is the same as the input video signal level. The key signal level of 0.0 means that the transfer gain is 0.0, where the output video signal level is zero level however high the input video signal level is.

It is noted that the key signal representation is not limited to the above-mentioned key signal and other key signal representation suitable for each design specification of the apparatus may be used. For example, when the key signal level is represented by analog voltage signal, it is possible to define the voltage level of 700 Mv as the key signal level of 1.0 and the voltage level of 0.0 Mv as the key signal level of 0.0, where the voltage level varies linearly in response to the key signal. On the contrary, when the key signal is represented by digital signal using eight bits, it is possible to define the digital signal representing 255 as the key signal level of 1.0 and the digital signal representing 0 as the key signal level of 0.0, where the numerical value of the digital signal varies linearly in response to the key signal.

The video signal generator 12 supplies the input video signal $V_2$ and the input key signal $K_2$ to the video mixing apparatus 1. A video signal generator 10 supplies the background video signal $V_b$ to the video mixing apparatus 1.

The video signal generators 11 and 12 generate a video signal representing characters and/or graphics, for example. The video signal generator 10 generates, for example, a video signal representing a background in an image displayed by the display 13 against which video images represented by the video signal generated by the video signal generators 11 and 12 are displayed. The background can be a video image representing characters and/or graphics, or alternatively a plain image including no variation in video signal. The video signals generated by the video signal generators 11 and 12 can also represent plain images including no variation in video signal.

The key signal mixer 101 receives the input key signals $K_1$ and $K_2$, and generates and outputs a mixed key signal $K_m$ and a priority key signal $K_p$.

A key signal division section 102 divides the priority key signal $K_p$ by the mixed key signal $K_m$, and outputs the result of division as a video gain control signal $K_g$ to a video signal mixer 103.

The video signal mixer 103 mixes the input video signals $V_1$ and $V_2$ in accordance with the video gain control signal $K_g$, and outputs a mixed video signal $V_{m1}$.

A video signal mixer 104 mixes the background video signal $V_b$ supplied by the video signal generator 10 and the mixed video signal $V_{m1}$ in accordance with the mixed key signal $K_m$, and outputs the result of mix as a mixed video signal $V_{m2}$ to the display 13. The display 13 displays an image of characters and/or graphics in accordance with the received mixed video signal $V_{m2}$. For example, a cathode-ray tube, a liquid crystal display panel, or a plasma display panel can be used as the display 13.

Figure 2:
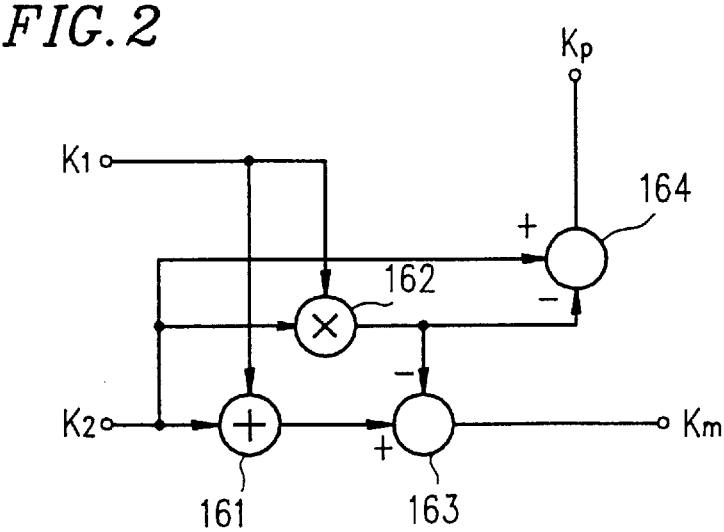
FIG. 2 is a block diagram showing the key signal mixer 101 shown in FIG. 1.

FIG. 2 is a block diagram showing the key signal mixer 101. The key signal mixer 101 includes an adder 161 for summing the input key signals $K_1$ and $K_2$, a multiplier 162 for multiplying the input key signal $K_1$ by the input key signal $K_2$ (or vice versa), a subtracter 163 for generating the mixed key signal $K_m$ by subtracting the output of the multiplier 162 from the output of the adder 161, and a subtracter 164 for subtracting the output of the multiplier 162 from the input key signal $K_2$ so as to generate the priority key signal $K_p$. The levels of the mixed key signal $K_m$ and the priority key signal $K_p$ can be expressed by the following equations:

$$K_p = K_2 - K_1 K_2$$

$$K_m = K_1 + K_2 - K_1 K_2$$

Figure 3:
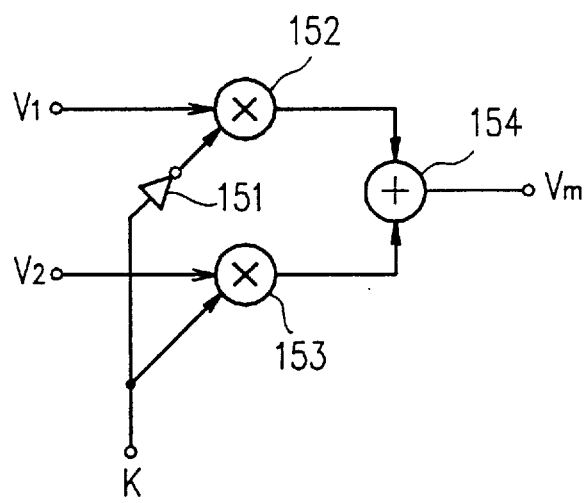
FIG. 3 is a block diagram showing the video signal mixer 103 or 104 shown in FIG. 1.

FIG. 3 is a block diagram showing the video signal mixer 103 or 104. As the video signal mixer 103, the circuit shown in FIG. 3 functions in the following manner: terminals $V_1$ and $V_2$ receive the input video signals $V_1$ and $V_2$, respectively; a terminal K receives the video gain control signal $K_g$; and a terminal $V_m$ outputs a first mixed video signal $V_{m1}$. As the video signal mixer 104, the circuit shown in FIG. 3 functions in the following manner: the terminals $V_1$ and $V_2$ receive the background video signal $V_b$ and the mixed video signal $V_{m2}$, respectively; the terminal K receives the mixed key signal $K_m$; and the terminal $V_m$ outputs a second mixed video signal $V_{m2}$. The video signal mixers 103 and 104 each includes a complementing operator 151 for a key signal input from the terminal K, multipliers 152 and 153 for controlling the respective gains of the video signals $V_1$ and $V_2$, and an adder 154 for summing the outputs of the multipliers 152 and 153. In this specification, "complement" operation is defined as operation of deriving (1−K) for the key signal input from the terminal K. The levels of the mixed video signals $V_{m1}$ and $V_{m2}$ output from the video signal mixers 103 and 104, respectively, can be expressed by the following equations:

$$V_{m1} = (1 - K_g) V_1 + K_g V_2$$

$$V_{m2} = (1 - K_m) V_b + K_m V_{m1}$$

Figure 4A:
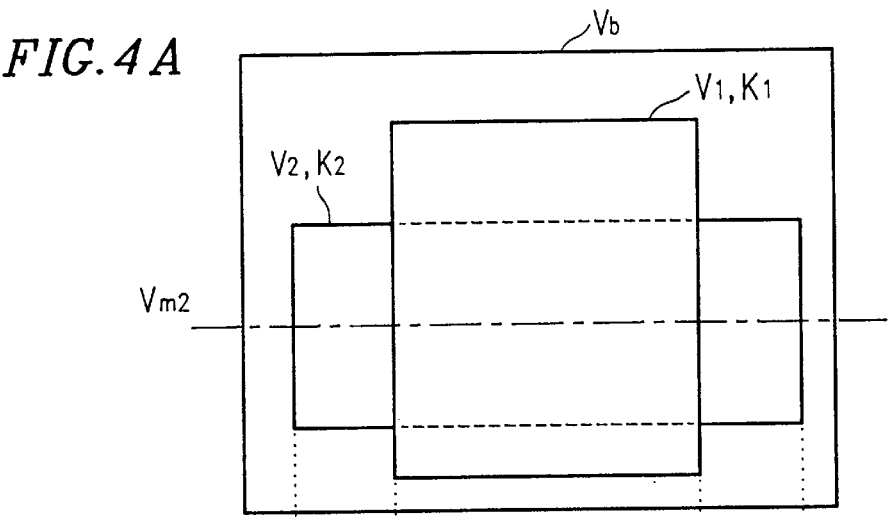
FIG. 4A illustrates a mixed image to be displayed on the display 13 shown in FIG. 1.
Figure 4B:
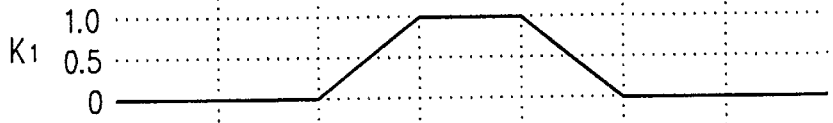
FIG. 4B is a diagram showing the level of an input key signal $K_1$.

FIG. 4A illustrates a mixed image to be displayed on the display 13. FIGS. 4B to 4H show the levels of the input key signal $K_1$, the input key signal $K_2$, the mixed key signal $K_m$, the priority key signal $K_p$, the video gain control signal $K_g$, the mixed video signal $V_{m1}$, and the mixed video signal $V_{m2}$, respectively.

The video signal generators 11 and 12, respectively, supply the input key signal $K_1$ (shown in FIG. 4B) and the input key signal $K_2$ (shown in FIG. 4C) to the key signal mixer 101. The mixed key signal $K_m$ output from the key signal mixer 101 is as shown in FIG. 4D. The priority key signal $K_p$ output from the key mixer 101 is as shown in FIG. 4E.

The key signal division section 102 divides the priority key signal $K_p$ (shown in FIG. 4E) by the mixed key signal $K_m$, (shown in FIG. 4D), and outputs the result of division to the video signal mixer 103 as the video gain control signal $K_g$. As shown in FIG. 4F, the video gain control signal $K_g$, which is the result of division, has a waveform whose gain is controlled in such a manner that the input key signal $K_2$ is amplified to the full level in regions where the two input key signals $K_1$ and $K_2$ do not overlap with each other and that the input key signal $K_2$ non-linearly decreases in accordance with the level of the input key signal $K_1$ where the two input key signals $K_1$ and $K_2$ overlap with each other.

Figure 4C:
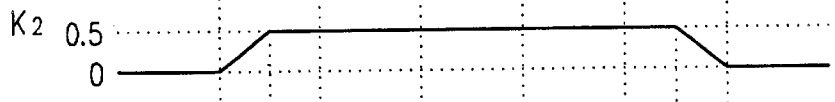
FIG. 4C is a diagram showing the level of an input key signal $K_2$.
Figure 4D:
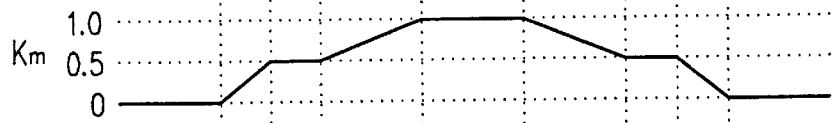
FIG. 4D is a diagram showing the level of a mixed key signal $K_m$.
Figure 4E:
FIG. 4E is a diagram showing the level of a priority key signal $K_p$.
Figure 4F:
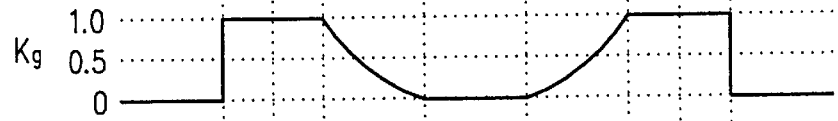
FIG. 4F is a diagram showing the level of a video gain control signal $K_g$.
Figure 4G:
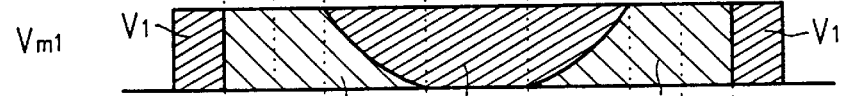
FIG. 4G is a diagram showing the level of a mixed video signal $V_{m1}$.

The video signal mixer 103 mixes the input video signals $V_1$ and $V_2$ in accordance with the video gain control signal $K_g$ (shown in FIG. 4F) and outputs the result of mix to the video signal mixer 104 as the mixed video signal $V_{m1}$ shown in FIG. 4C.

Figure 4H:
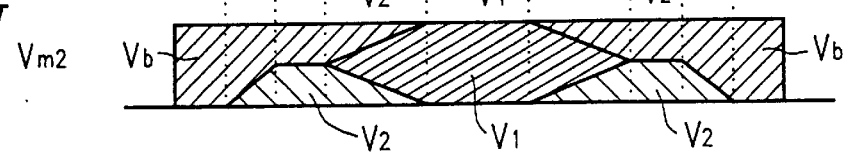
FIG. 4H is a diagram showing the level of a mixed video signal $V_{m2}$.

The video signal mixer 104 mixes the background video signal $V_b$ and the mixed video signal $V_{m1}$ in accordance with the mixed key signal $K_m$ (shown in FIG. 4D) and outputs the result of mix as the mixed video signal $V_{m2}$ shown in FIG. 4H. The mixed video signal $V_{m2}$ is a video signal in which the input video signals $V_1$ and $V_2$ are inserted into the background video signal $V_b$.

In regions where the input key signal $K_1$ is at the zero level and the input key signal $K_2$ is at an intermediate level (i.e., a level which is larger than 0 and smaller than 1), the input video signal $V_2$ is output at the full level as the mixed video signal $V_{m1}$. However, the mixed key signal $K_m$ supplied to the video signal mixer 104 is at the same level as that of the input key signal $K_2$. In regions where the input key signal $K_1$ is at the zero level and the input key signal $K_2$ is at an intermediate level, the input video signal $V_2$ is output, as the resultant mixed video signal $V_{m2}$, at a level designated by the input key signal $K_2$. Thus, in accordance with the video mixing apparatus of the present example, a desired video mix is achieved in the case where one of the input key signals is at an intermediate level, without allowing non-linear mix characteristics to be generated due to multiple interaction of the key signals.

In the mixed video signal $V_{m1}$, the input video signals $V_1$ and $V_2$ are subjected to non-linear mix in regions where the input key signals $K_1$ and $K_2$ are both at intermediate levels. However, in the second video signal mixer 104, such a non-linearly mixed video is cancelled by the interaction with the mixed key signal $K_m$, so that the mix becomes linear as a whole. Thus, in accordance with the video mixing apparatus of the present example, desired (i.e., linear) video mix is achieved in the case where two input key signals are both at intermediate levels. Therefore, one of the objectives of the present invention, i.e., linear mix in the case where two input key signals are both at intermediate levels, is achieved under the condition that the background video signal $V_b$ is led through the video signal mixer only once.

In Example 1, the key signal division section 102 outputs a zero-level signal as the result of division (i.e., the video gain control signal $K_g$) in the case where the divisor of the division (i.e., the mixed key signal $K_m$) is at the zero level. However, the regions in which the mixed key signal $K_m$ is at the zero level are regions in which the background video signal $V_b$ is inserted at the full level in the subsequent video signal mixer 104. Therefore, when the mixed key signal $K_m$ is at the zero level, it is not necessary for the key signal division section 102 to output a zero-level signal as the result of the division; the key signal division section 102 can output a signal at any level.

Figure 5:
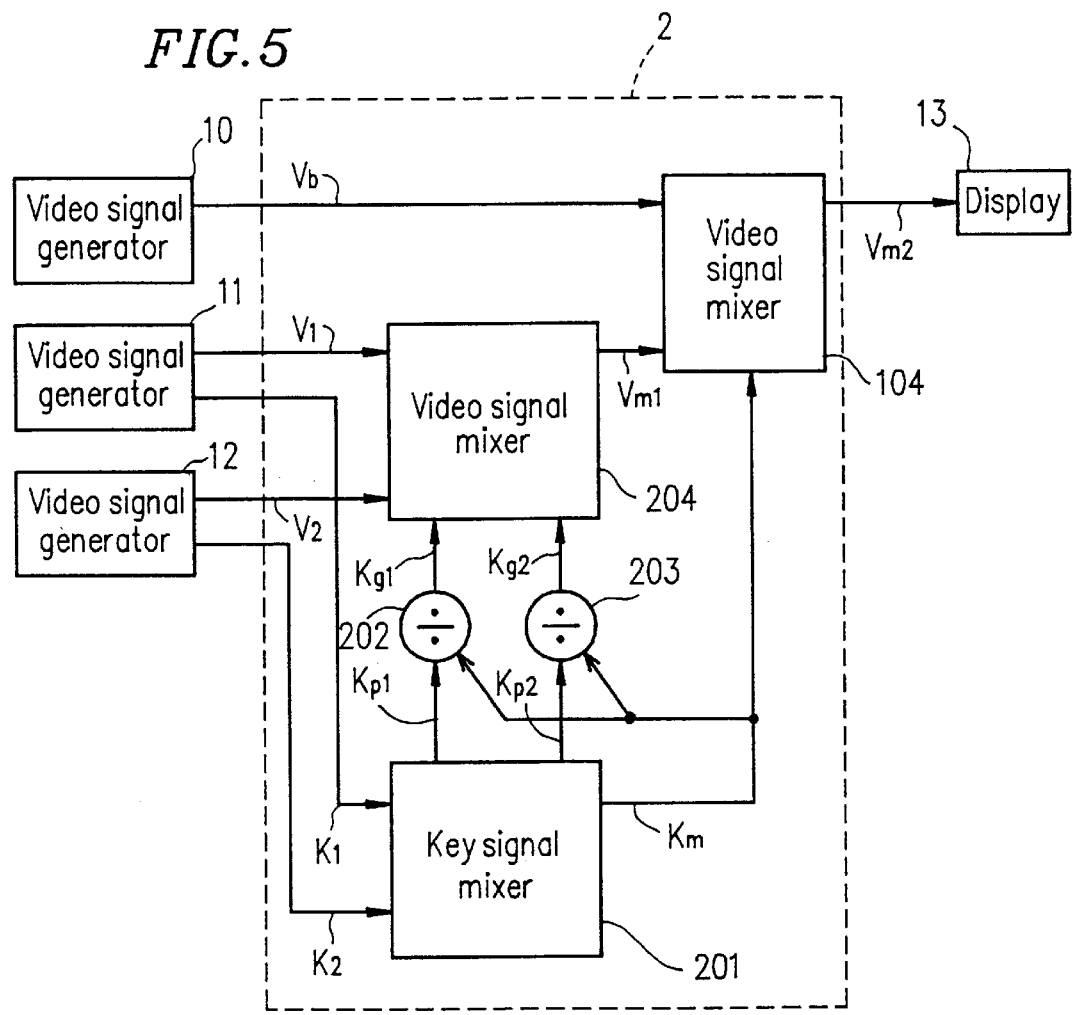
FIG. 5 is a block diagram showing a variation of the video mixing apparatus of Example 1.

FIG. 5 is a block diagram showing a variation of the video mixing apparatus of Example 1. In the video mixing apparatus 1, the video signal mixer 103 for mixing input video signals performs a key mixing process in accordance with one video gain control signal $K_g$. In the video mixing apparatus 2 shown in FIG. 5, a video signal mixer 204 mixes input video signals $V_1$ and $V_2$ in accordance with a plurality of video gain control signals $K_{g1}$ and $K_{g2}$. The video mixing apparatus 2 also attains the same effect attained by the video mixing apparatus 1.

In the video mixing apparatus 2, the key signal mixer 201 receives input key signals $K_1$ and $K_2$, and generates and outputs priority key signals $K_{p1}$ and $K_{p2}$ and a mixed key signal $K_m$. Key signal division sections 202 and 203 divide the priority key signals $K_{p1}$ and $K_{p2}$ each by the mixed key signal $K_m$, and outputs the results of division as video gain control signals $K_{g1}$ and $K_{g2}$. The video signal mixer 204 adds a result of multiplication of the input video signal $V_1$ by the video gain control signal $K_{g1}$ with a result of multiplication of the input video signal $V_2$ by the video gain control signal $K_{g2}$, and generates a mixed video signal $V_{m1}$.

Thus, the video signal mixer 204 mixes the input video signals $V_1$ and $V_2$ in accordance with the video gain control signals $K_{g1}$ and $K_{g2}$, and outputs the result of mix to the video signal mixer 104 as the mixed video signal $V_{m1}$. The video signal mixer 104 mixes a background video signal $V_b$ supplied from a video signal generator 10 and the mixed video signal $V_{m1}$ in accordance with the mixed key signal $K_m$, and outputs the result of mix as a mixed video signal $V_{m2}$ to a display 13. The display 13 displays an image represented by the received mixed video signal $V_{m2}$ on its screen.

Figure 6:
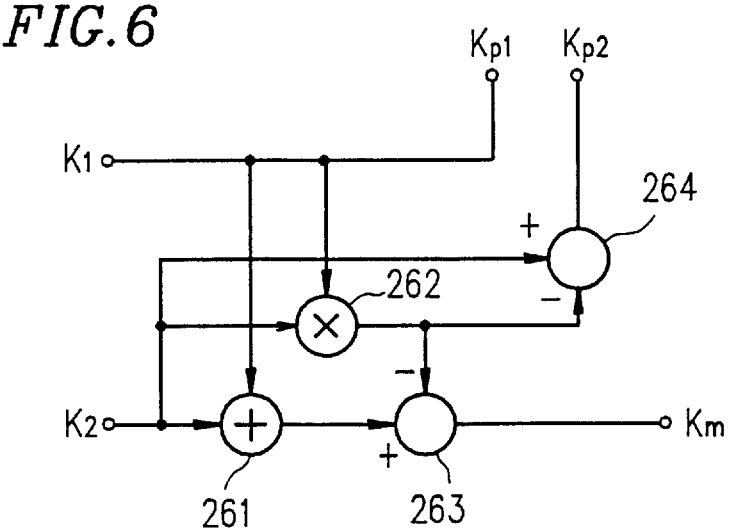
FIG. 6 is a block diagram showing the key signal mixer 201 shown in FIG. 5.

FIG. 6 is a block diagram showing the key signal mixer 201. The key signal mixer 201 includes an adder 261 for summing the input key signals $K_1$ and $K_2$, a multiplier 262 for multiplying the input key signal $K_1$ by the input key signal $K_2$ (or vice versa), a subtracter 263 for generating the mixed key signal $K_m$, by subtracting the output of the multiplier 262 from the output of the adder 261, and a subtracter 264 for subtracting the output of the multiplier 262 from the input key signal $K_2$ so as to generate the priority key signal $K_{p2}$. The input key signal $K_1$ is output as the priority key signal $K_{p1}$, without being processed. The levels of the priority key signals $K_{p1}$ and $K_{p2}$ and the mixed key signal $K_m$ can be expressed by the following equations:

$$K_{p1}=K_1$$

$$K_{p2}=K_2-K_1K_2$$

$$K_m=K_1+K_2-K_1K_2$$

Figure 7:
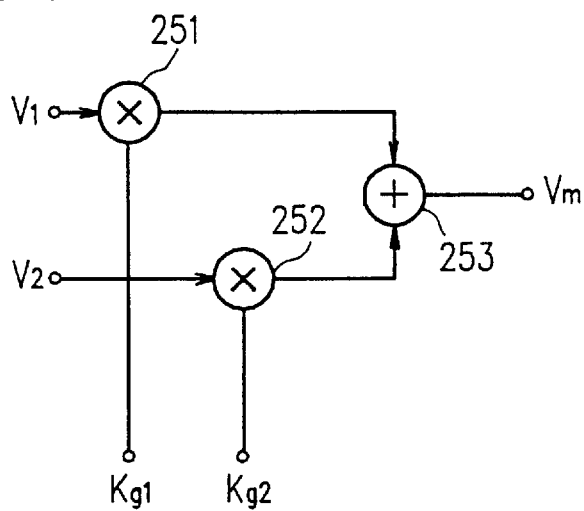
FIG. 7 is a block diagram showing the video signal mixer 204 shown in FIG. 5.

FIG. 7 is a block diagram showing the video signal mixer 204. The video signal mixer 204 includes two multipliers 251 and 252 for controlling the gains of the video signals $V_1$ and $V_2$ and an adder 253 for summing the outputs of the multipliers 251 and 252. The level of the mixed video signals $V_{m1}$ output from the video signal mixers 204 can be expressed by the following equation:

$$V_{m1}=K_{g1}V_1+K_{g2}V_2$$

The difference between the video mixing apparatus 1 shown in FIG. 1 and the video mixing apparatus 2 shown in FIG. 5 lies in the video gain for the input video signal $V_1$ in the video signal mixer when the key signals $K_1$ and $K_2$ are both at the zero level.

In either video mixing apparatus, however, the mixed key signal $K_m$ is at the zero level when both the key signals $K_1$ and $K_2$ are at the zero level. When the mixed key signal $K_m$ is at the zero level, the video gain for the mixed video signal $V_{m1}$ in the video signal mixer 104 is at the zero level. As a result, the difference between the two apparatus is cancelled so that the difference does not exist in the mixed video signal $V_{m2}$ to be finally output. Consequently, the video mixing apparatus 2 shown in FIG. 5, in which the video gain control signals $K_{g1}$ and $K_{g2}$ are provided for the input video signals $V_1$ and $V_2$, attains the same effect attained by the video mixing apparatus 1 shown in FIG. 1.

In accordance with the video mixing apparatus 2, the priority key signals $K_{p1}$ and $K_{p2}$ are each divided by the mixed key signal $K_m$. In order to avoid non-linear mix characteristics resulting from the interaction of a number of key signals, the mixing of video signals in the video signal mixer 204 can be performed in accordance with the priority key signals $K_{p1}$ and $K_{p2}$, instead of the video gain control signals $K_{g1}$ and $K_{g2}$, and by dividing the mixed video signal $V_{m1}$ by the mixed key signal $K_m$. However, in this case, the video signals are once subjected to a gain control process in the video signal mixer 204 in accordance with the priority key signals $K_{p1}$ and $K_{p2}$, and again subjected to a gain control process in the division section based on a reciprocal number of the mixed key signal $K_m$. In the case where one of the input key signals $K_1$ and $K_2$ is at an intermediate level and the other is at the zero level, the mixed key signal $K_m$ will be equal to the input key signal which is not at the zero level. In such a case, the video signals are attenuated to an intermediate level by the video signal mixer 204 and then divided so as to be amplified to the full level in a video mixing apparatus where the mixed video signal $V_{m1}$ is divided by the mixed key signal $K_m$. This results in a deterioration of the image quality.

In contrast, in accordance with the video mixing apparatus 2 of the present invention, the key signal division sections 202 and 203 divide the priority key signals $K_{p1}$ and $K_{p2}$ by the mixed key signal $K_m$ before they are output to the video signal mixer 204. As a result, the gain control signals, rather than video signals themselves, are amplified to the full level through division processes. Thus, the number of gain control processes performed for the video signals can be reduced relative to the above-described configuration, so that the operation precision can be maintained high, thereby preventing deterioration of image quality.

Some character/graphics generation apparatuses or superimposing apparatuses (or captioning apparatuses) in a video edition system perform a key mixing process for a background video signal and a mixed video signal at a video switcher. In the case where the video signal mixer 104 for mixing the mixed video signal $V_{m1}$ and the background video signal $V_b$ is provided in a video switcher, the video signal mixer 104 can be omitted from the video mixing apparatus 1 or 2. In other words, the video mixing apparatus 1 and 2 will function sufficiently without incorporating the video signal mixer 104 as long as they are capable of outputting the mixed video signal $V_{m1}$ and the mixed key signal $K_m$.

(Example 2)

Figure 8:
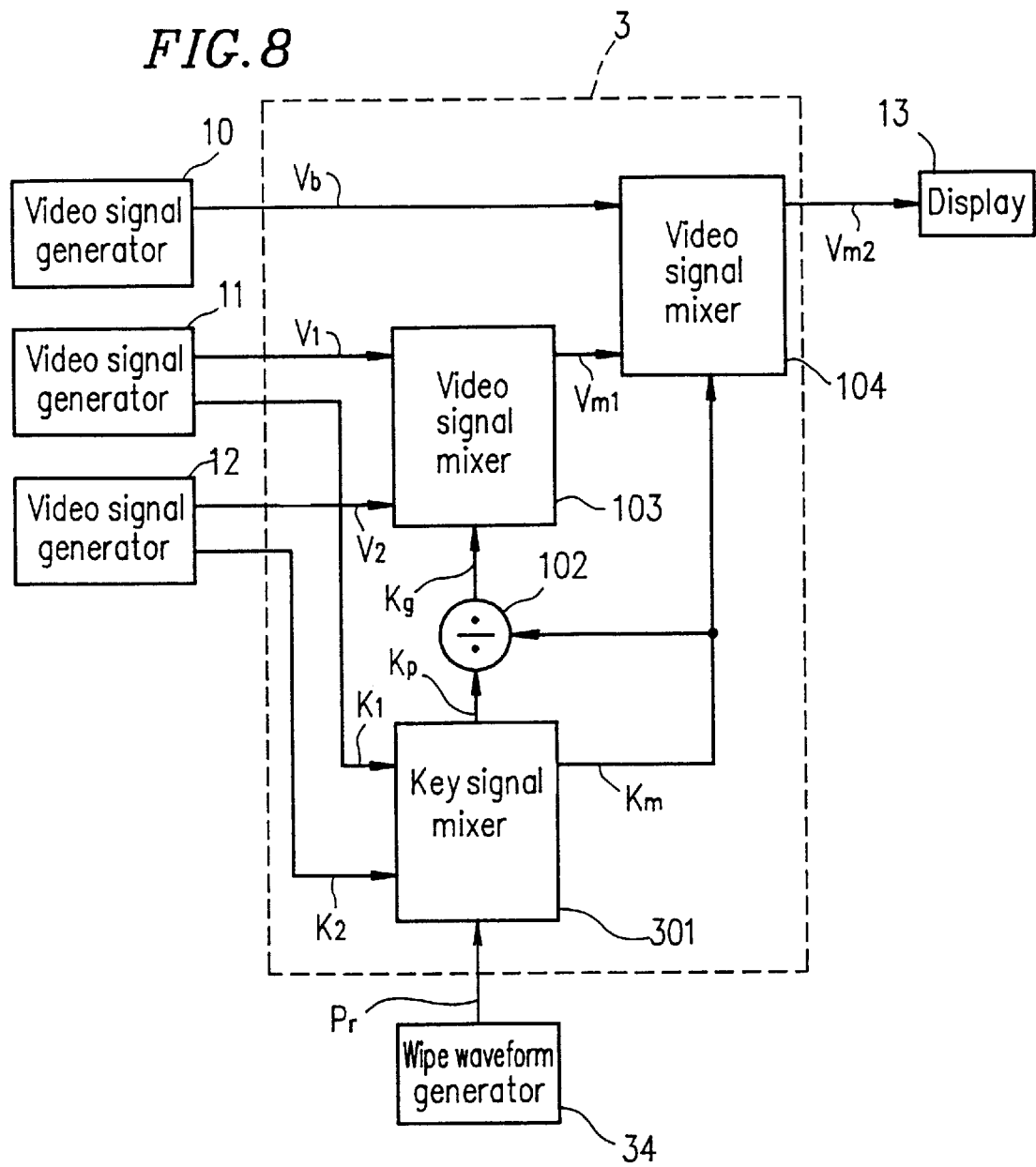
FIG. 8 is a block diagram showing a video mixing apparatus 3 according to Example 2 of the present invention.

FIG. 8 is a block diagram showing a video mixing apparatus 3 according to Example 2 of the present invention. The video mixing apparatus 3 mixes input video signals $V_1$ and $V_2$ and a background video signal $V_b$ in accordance with a mix priority key signal $P_r$ and input key signals $K_1$ and $K_2$.

A wipe waveform generator 34 generates a mix priority key signal $P_r$ and outputs the mix priority key signal $P_r$ to a key signal mixer 301. The key signal mixer 301 receives the input key signals $K_1$ and $K_2$ and the mix priority key signal $P_r$, and generates and outputs a mixed key signal $K_m$ and a priority key signal $K_p$.

A key signal division section 102 divides the priority key signal $K_p$ by the mixed key signal $K_m$, and outputs the result of division as a video gain control signal $K_g$ to a video signal mixer 103. The video signal mixer 103 mixes the input video signals $V_1$ and $V_2$ in accordance with a video gain control signal $K_g$, and outputs the result of mix as a mixed video signal $V_{m1}$ to a video signal mixer 104.

The video signal mixer 104 mixes the background video signal $V_b$ (supplied from a video signal generator 10) and the mixed video signal $V_{m1}$ in accordance with the mixed key signal $K_m$, and outputs the result of mix as a mixed video signal $V_{m2}$ to the display 13.

Figure 9:
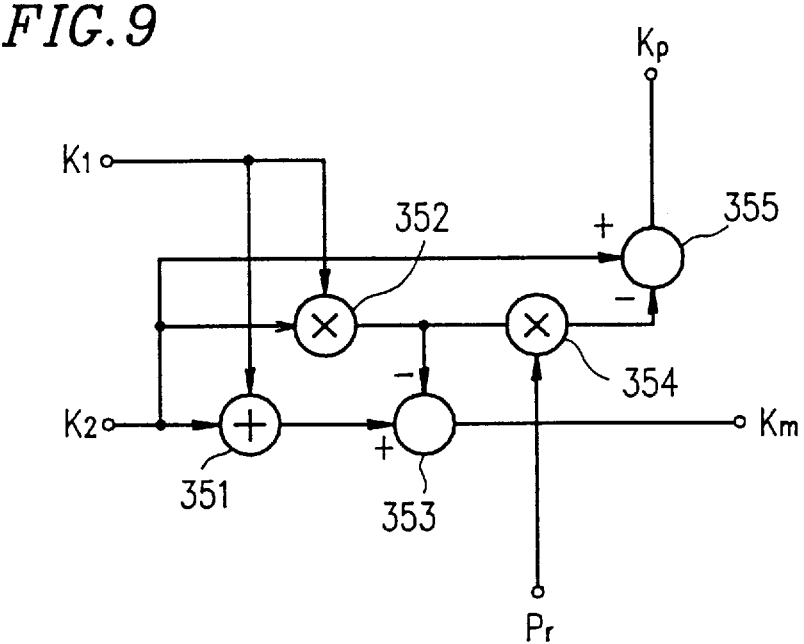
FIG. 9 is a block diagram showing the key signal mixer 301 shown in FIG. 8.

FIG. 9 is a block diagram showing the key signal mixer 301. The key signal mixer 301 includes an adder 351 for summing the input key signals $K_1$ and $K_2$, a multiplier 352 for multiplying the input key signal $K_1$ by the input key signal $K_2$ (or vice versa), a subtracter 353 for generating the mixed key signal $K_m$ by subtracting the output of the multiplier 352 from the output of the adder 351, a second multiplier 354 for multiplying the output of the first multiplier 352 by the mix priority key signal $P_r$, and a subtracter 355 for subtracting the output of the multiplier 354 from the input key signal $K_2$ so as to generate the priority key signal $K_p$. The levels of the priority key signal $K_p$ and the mixed key signal $K_m$, which are outputs of the key signal mixer 301, can be expressed by the following equations:

$$K_p = K_2 - P_r K_1 K_2$$

$$K_m = K_1 + K_2 - K_1 K_2$$

Figure 10A:
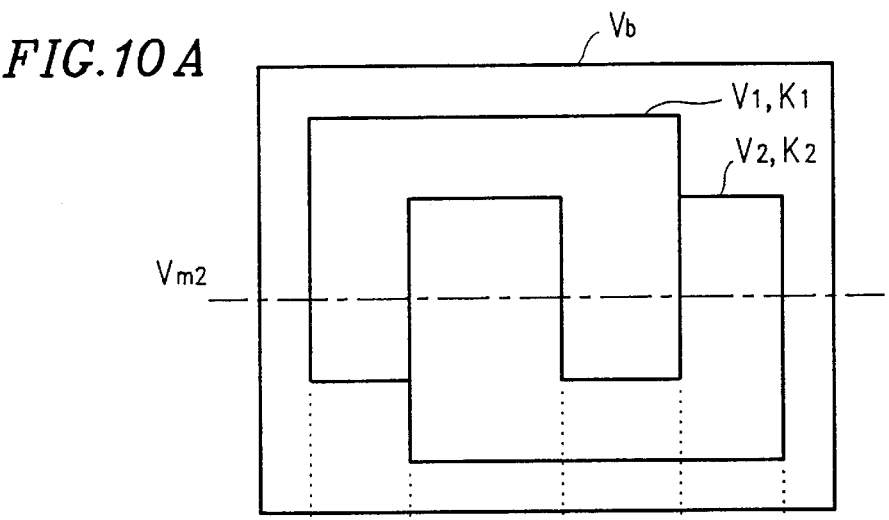
FIG. 10A is a diagram showing the level of a mixed image to be displayed by the display 13 shown in FIG. 8.
Figure 10B:
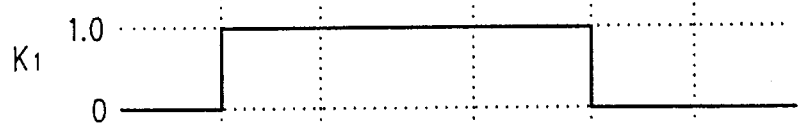
FIG. 10B is a diagram showing the level of an input key signal $K_1$.
Figure 10C:
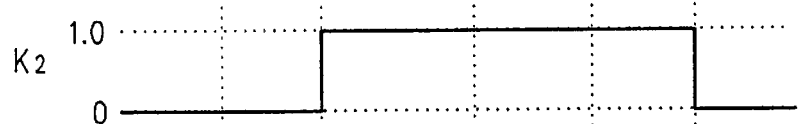
FIG. 10C is a diagram showing the level of an input key signal $K_2$.
Figure 10D:
FIG. 10D is a diagram showing the level of a mix priority key signal $P_r$.
Figure 10E:
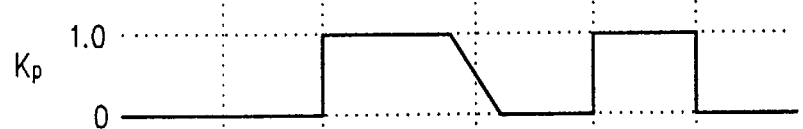
FIG. 10E is a diagram showing the level of a priority key signal $K_p$.
Figure 10F:
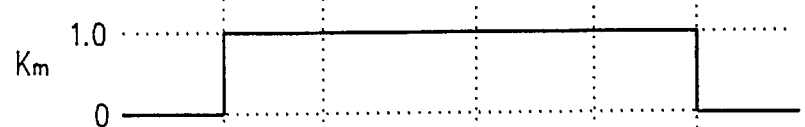
FIG. 10F is a diagram showing the level of a mixed key signal $K_m$.
Figure 10G:
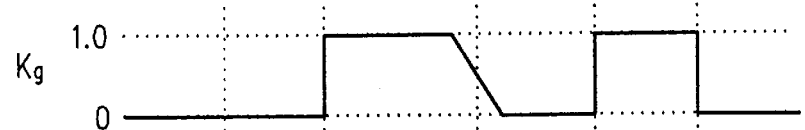
FIG. 10G is a diagram showing the level of a video gain control signal $K_g$.

FIG. 10A is a diagram showing a mixed image to be displayed by the display 13. FIGS. 10B to 10I are diagrams showing the input key signals $K_1$ and $K_2$, the mix priority key signal $P_r$, the priority key signal $K_p$, the mixed key signal $K_m$, the video gain control signal $K_g$, the mixed video signals $V_{m1}$, and the mixed video signals $V_{m2}$, respectively.

The video signal generator 11 and the video signal generator 12 output the input key signal $K_1$ (shown in FIG. 10B) and the input key signal $K_2$ (shown in FIG. 10C), respectively, to the key signal mixer 301. The wipe waveform generator 34 outputs the mix priority key signal $P_r$ to the key signal mixer 301. A key signal division section 102 divides the priority key signal $K_p$ (shown in FIG. 10E) by the mixed key signal $K_m$ (shown in FIG. 10F) and outputs the result of division as the video gain control signal $K_g$ (shown in FIG. 10G).

Figure 10H:
FIG. 10H is a diagram showing the level of a mixed video signal $V_{m1}$.

A video signal mixer 103 mixes the input video signal $V_1$ and the input video signal $V_2$ in accordance with the video gain control signal $K_g$, and outputs the mixed video signal $V_{m1}$ shown in FIG. 10H.

Figure 10I:
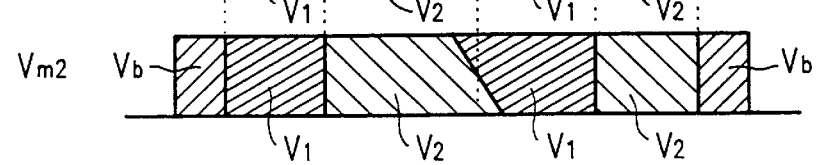
FIG. 10I is a diagram showing the level of a mixed video signal $V_{m2}$.

The video signal mixer 104 mixes the background video signal $V_b$ and the mixed video signal $V_{m1}$ in accordance with the mixed key signal $K_m$ and outputs the result of mix as the mixed video signal $V_{m2}$ shown in FIG. 10I. As a result, the input video signals $V_1$ and $V_2$ are inserted into the background video signal $V_b$ as shown in FIG. 10I.

In Example 1, the input video signal $V_1$ was mixed into the mixed video signal $V_{m2}$ with a higher priority over the input video signal $V_2$ in regions where the input key signals $K_1$ and $K_2$ overlap with each other. In other words, the priorities of the input video signal $V_1$, the input video signal $V_2$, and the background video signal $V_b$ increases in this order when mixed. In Example 2, however, the mix priority key signal $P_r$ ensures that the input video signals $V_1$ and $V_2$ are mixed so as to be positioned as if intersecting or overlaying each other in a three-dimensional manner (as shown in FIG. 10A) before being inserted into the background video signal $V_b$.

Example 2 described a case where the value of the mix priority key signal $P_r$ varies depending on the specific location within the screen. In the case where the mix priority key signal $P_r$ has a constant value regardless of the location within the screen, the input video signals $V_1$ and $V_2$ are mixed at a predetermined ratio depending on the mix priority key signal $P_r$ before being mixed into the background video signal $V_b$. Therefore, Example 2 attains one of the objectives of the present invention; that is, two input video signals are mixed at a predetermined mix ratio and thereafter are mixed with a background video signal.

Figure 11:
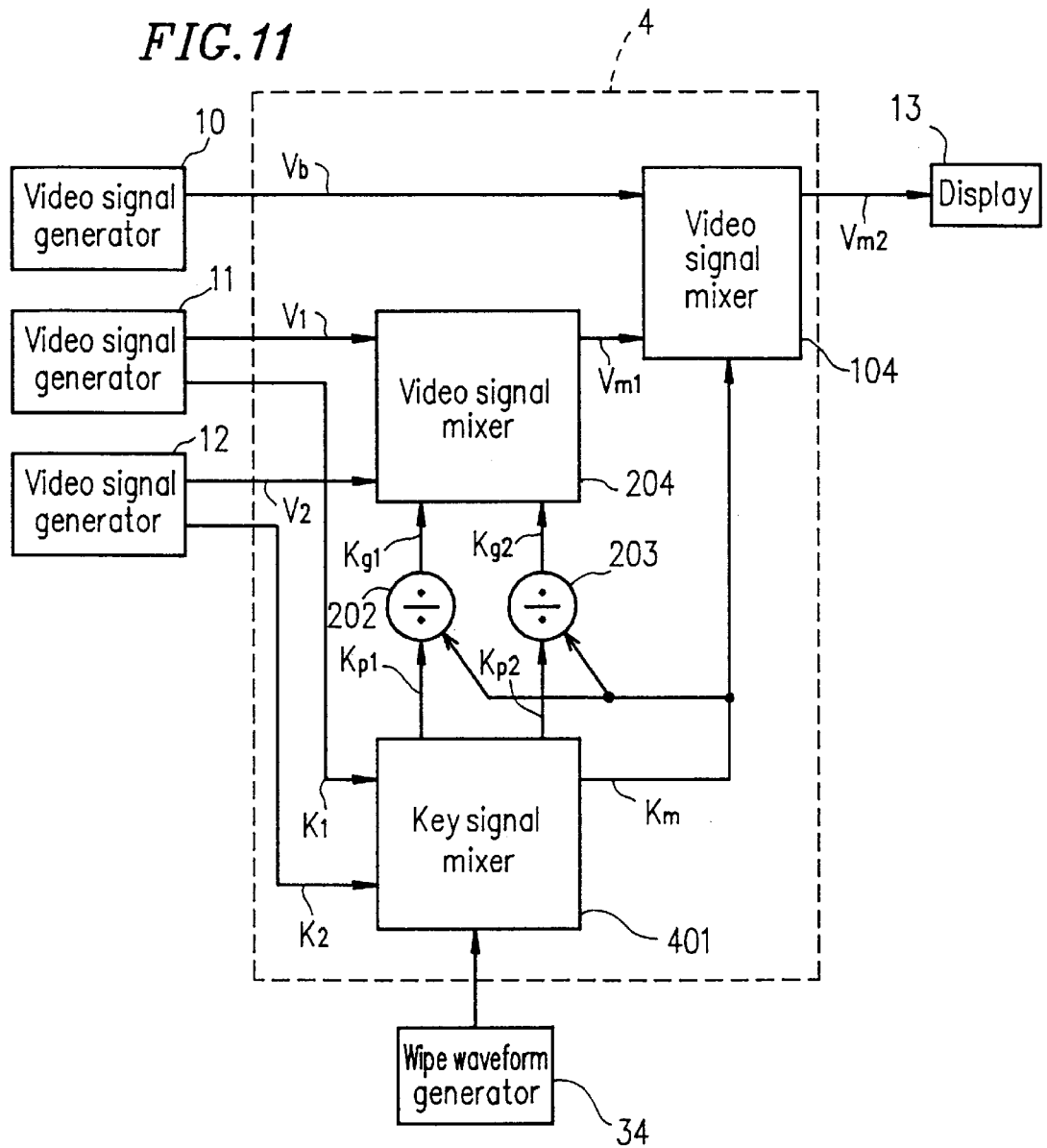
FIG. 11 is a block diagram showing a variation of the video mixing apparatus of Example 2.

FIG. 11 is a block diagram showing a variation of the video mixing apparatus of Example 2. As in Example 1, the same effect attained by the video mixing apparatus 2 can be attained by mixing the input video signals $V_1$ and $V_2$ in accordance with a plurality of video gain control signals $K_{g1}$ and $K_{g2}$. In this case, a key signal mixer 401 receives input key signals $K_1$ and $K_2$ and a mix priority key signal $P_r$, and generates and outputs priority key signals $K_{p1}$ and $K_{p2}$. Key signal division sections 202 and 203 respectively divide the priority key signals $K_{p1}$ and $K_{p2}$ each by the mixed key signal $K_m$, and outputs the results of division as video gain control signals $K_{g1}$ and $K_{g2}$ to a video signal mixer 204. The video signal mixer 204 adds a result of multiplication of the input video signal $V_1$ by the video gain control signal $K_{g1}$ and a result of multiplication of the input video signal $V_2$ by the video gain control signal $K_{g2}$, and outputs the resultant video signal as a mixed video signal $V_{m1}$ to a video signal mixer 104.

Figure 12:
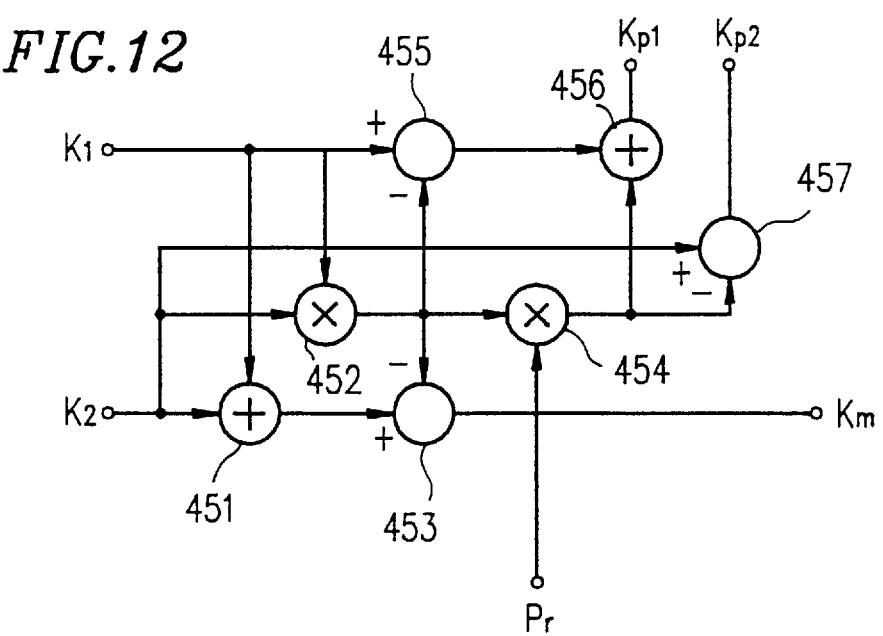
FIG. 12 is a block diagram showing the key signal mixer 401 shown in FIG. 11.

FIG. 12 is a block diagram showing the key signal mixer 401. The key signal mixer 401 includes an adder 451 for summing the input key signals $K_1$ and $K_2$, a multiplier 452 for multiplying the input key signal $K_1$ by the input key signal $K_2$ (or vice versa), a subtracter 453 for generating the mixed key signal $K_m$ by subtracting the output of the multiplier 452 from the output of the adder 451, a multiplier 454 for multiplying the output of the multiplier 452 by the mix priority key signal $P_r$, a subtracter 455 for subtracting the output of the multiplier 452 from the input key signal $K_1$, an adder 456 for summing the output of the subtracter 455 and the output of the multiplier 454 so as to output the priority key signal $K_{p1}$, and a subtracter 457 for subtracting the output of the multiplier 454 from the input key signal $K_2$ so as to output the priority key signal $K_{p2}$. The levels of the priority key signals $K_{p1}$ and $K_{p2}$ and the mixed key signal $K_m$ can be expressed by the following equations:

$$K_{p1}=K_1-K_1K_2+P_rK_1K_2$$

$$K_{p2}=K_2-P_rK_1K_2$$

$$K_m=K_1+K_2-K_1K_2$$

As in Example 1, in the case where the video signal mixer 104 for mixing the mixed video signal $V_{m1}$ and the background video signal $V_b$ is provided in a video switcher, the video signal mixer 104 can be omitted from the video mixing apparatus 3 or 4. In other words, the video mixing apparatuses 3 and 4 will function sufficiently without incorporating the video signal mixer 104 as long as they are capable of outputting the mixed video signal $V_{m1}$ and the mixed key signal $K_m$.

(Example 3)

Figure 13:
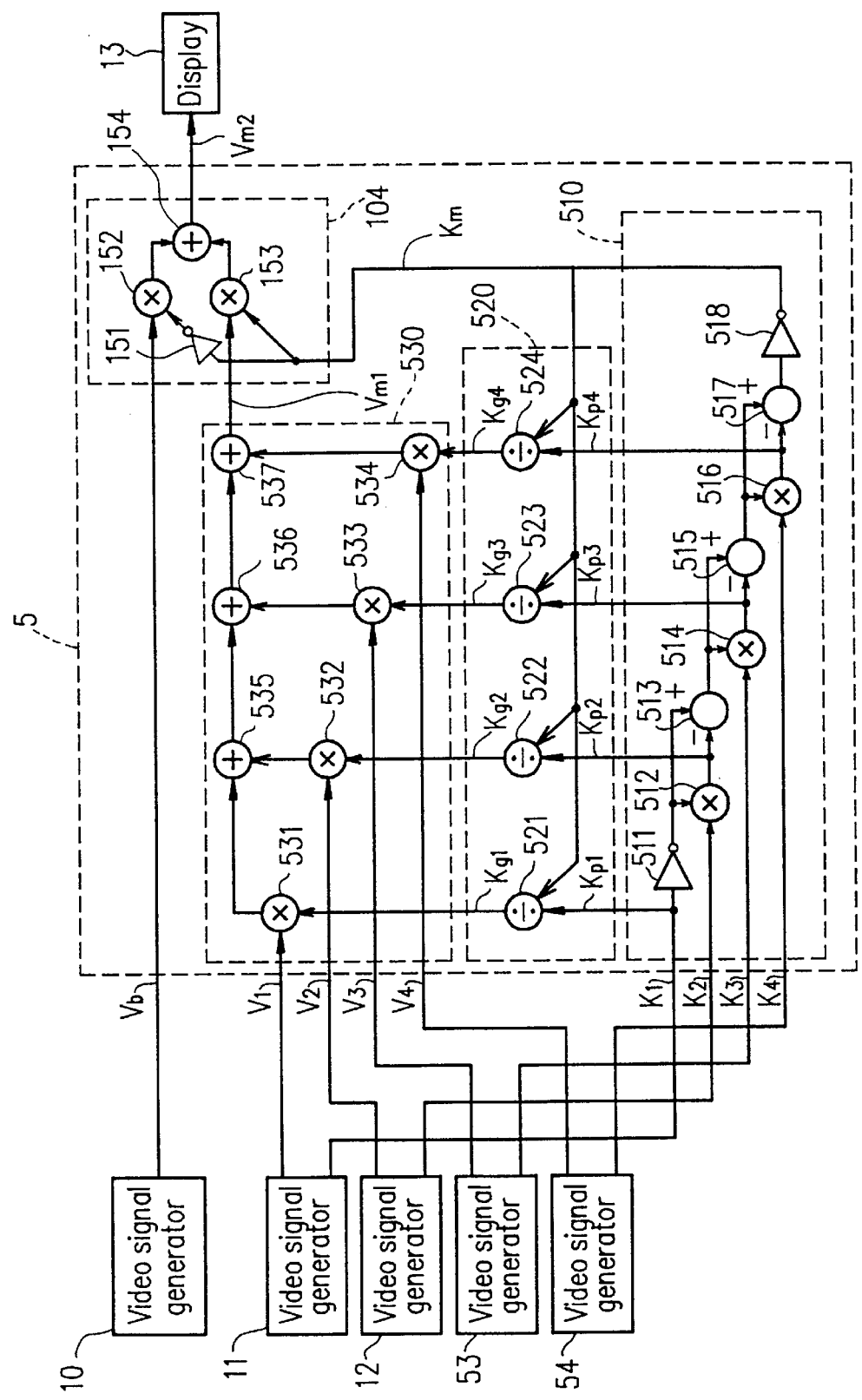
FIG. 13 is a block diagram showing a video mixing apparatus 5 according to Example 3 of the present invention.

FIG. 13 is a block diagram showing a video mixing apparatus 5 according to Example 3 of the present invention. The video mixing apparatus 5 mixes input video signals $V_1$ to $V_4$ and a background video signal $V_b$ in accordance with input key signal $K_1$ to $K_4$.

Video signal generators 11 and 12 output input key signals $K_1$ and $K_2$, respectively, and also output, respectively, input video signals $V_1$ and $V_2$. Similarly, video signal generators 53 and 54 output input key signals $K_3$ and $K_4$, respectively, and also output, respectively, input video signals $V_3$ and $V_4$.

A key signal mixer 510 receives the input key signals $K_1$ to $K_4$ (which are output from the video signal generators 11, 12, 53, and 54, respectively), and outputs a mixed key signal $K_m$ and priority key signals $K_{p1}$ to $K_{p4}$.

A key signal division section 520 divides the priority key signals $K_{p1}$ to $K_{p4}$ by the mixed key signal $K_m$, and outputs the respective results of division as video gain control signals $K_{g1}$ to $K_{g4}$ to a video signal mixer 530.

The video signal mixer 530 mixes the input video signals $V_1$ to $V_4$ in accordance with the video gain control signal $K_{g1}$ to $K_{g4}$, respectively, and outputs the resultant video signal as a mixed video signal $V_{m1}$ to a video signal mixer 104.

The video signal mixer 104 mixes the background video signal $V_b$ (output from a video signal generator 10) and the mixed video signal $V_{m1}$ in accordance with the mixed key signal $K_m$, and outputs the result of mix as a mixed video signal $V_{m2}$ to a display 13. The display 13 displays the mixed video signal $V_{m2}$ on its screen.

The key signal mixer 510 includes a complementing operator 511 for deriving a complement for the input key signal $K_1$; a multiplier 512 for multiplying the output of the complementing operator 511 by the input key signal $K_2$ so as to output the priority key signal $K_{p2}$; a subtracter 513 for subtracting the output of the multiplier 512 from the output of the complementing operator 511, a multiplier 514 for multiplying the output of the subtracter 513 by the input key signal $K_3$ so as to output the priority key signal $K_{p3}$, a subtracter 515 for subtracting the output of the multiplier 514 from the output of the subtracter 513, a multiplier 516 for multiplying the output of the subtracter 515 and the input key signal $K_4$ so as to output the priority key signal $K_{p4}$, a subtracter 517 for subtracting the output of the multiplier 516 from the output of the subtracter 515, and a complementing operator 518 for deriving a complement for the output of the subtracter 517. The input key signal $K_1$ is output as the priority key signal $K_{p1}$ without being processed. The levels of the mixed key signal $K_m$ and the priority key signals $K_{p1}$ to $K_{p4}$ can be expressed by the following equations:

$$K_{p1}=K_1$$

$$K_{p2}=K_2(1-K_1)$$

$$K_{p3}=K_3(1-K_2)(1-K_1)$$

$$K_{p4}=K_4\,(1-K_3)\,(1-K_2)(1-K_1)$$

$$K_m=1-(1-K_4)(1-K_3)\,(1-K_2)(1-K_1)$$

The key signal division section 520 includes dividers 521 to 524 for dividing the priority key signals $K_{p1}$ to $K_{p4}$ by the mixed key signal $K_m$, respectively, so as to output the respective results of division as the video gain control signals $K_{g1}$ to $K_{g4}$. The video gain control signals $K_{g1}$ to $K_{g4}$ can be expressed by the following equations:

$$K_{g1}=K_{p1}/K_m$$

$$K_{g2}=K_{p2}/K_m$$

$$K_{g3}=K_{p3}/K_m$$

$$K_{g4}=K_{p4}/K_m$$

The video signal mixer 530 includes multipliers 531 to 534 and adders 535 to 537. The multipliers 531 to 534 output products obtained by multiplying the input video signals $V_1$ to $V_4$, respectively, by the video gain control signals $K_{g1}$ to $K_{g4}$, respectively. The adders 535 to 537 calculate summation of the products output by the multipliers 531 to 534, and output the summation as a mixed video signal $V_{m1}$. The mixed video signal $V_{m1}$ can be expressed by the following equation:

$$V_{m1}=K_{g1}V_1+K_{g2}V_2+K_{g3}V_3+K_{g4}V_4$$

Figure 14:
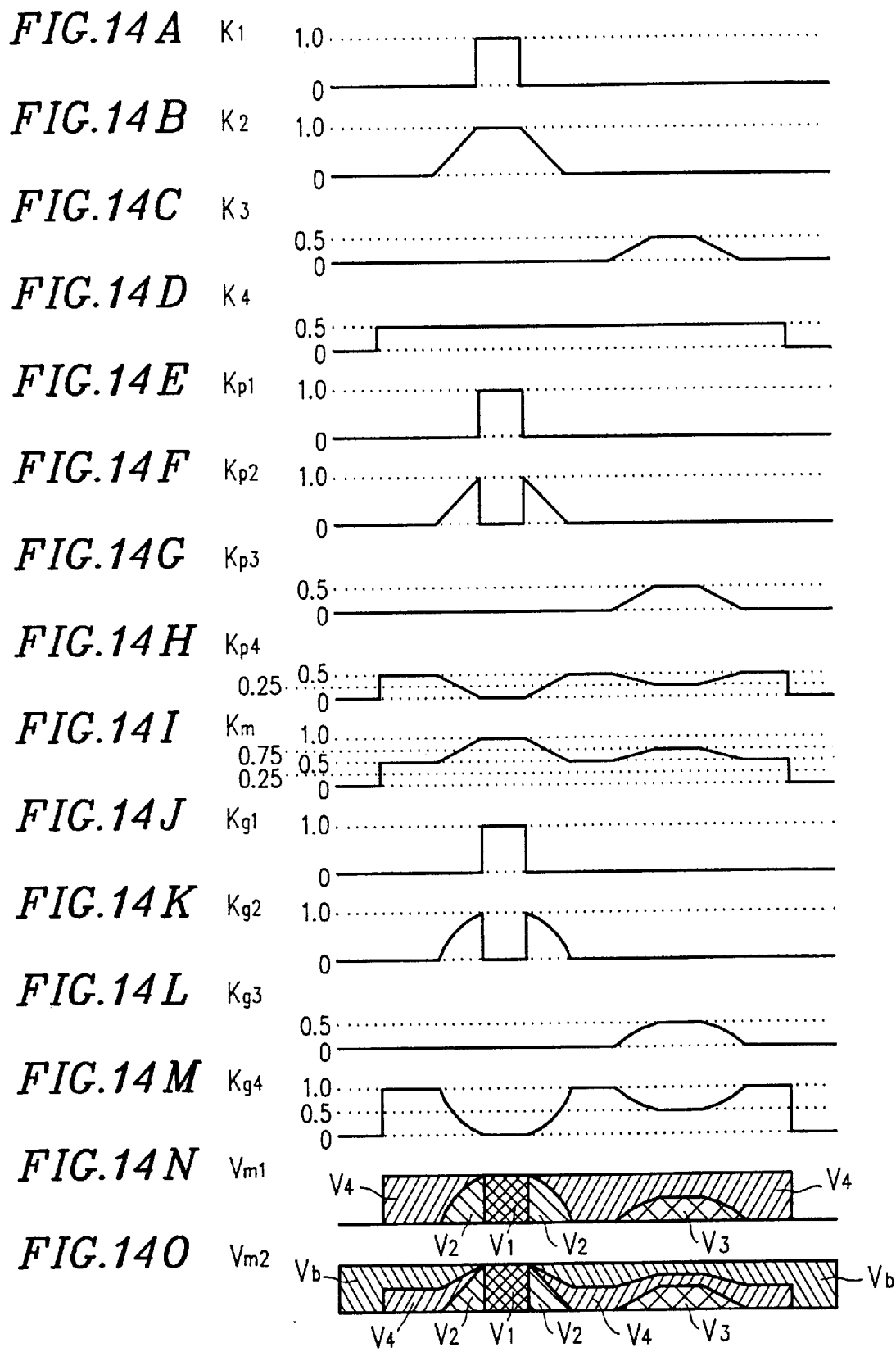
FIG. 14A is a diagram showing the level of an input key signal $K_1$.
FIG. 14B is a diagram showing the level of an input key signal $K_2$.
FIG. 14C is a diagram showing the level of an input key signal $K_3$.
FIG. 14D is a diagram showing the level of an input key signal $K_4$.
FIG. 14E is a diagram showing the level of a priority key signal $K_{p1}$.
FIG. 14F is a diagram showing the level of a priority key signal $K_{p2}$.
FIG. 14G is a diagram showing the level of a priority key signal $K_{p3}$.
FIG. 14H is a diagram showing the level of a priority key signal $K_{p4}$.
FIG. 14I is a diagram showing the level of a mixed key signal $K_m$.
FIG. 14J is a diagram showing the level of a video gain control signal $K_{g1}$.
FIG. 14K is a diagram showing the level of a video gain control signal $K_{g2}$.
FIG. 14L is a diagram showing the level of a video gain control signal $K_{g3}$.
FIG. 14M is a diagram showing the level of a video gain control signal $K_{g4}$.
FIG. 14N is a diagram showing the level of a mixed video signal $V_{m1}$.
FIG. 14O is a diagram showing the level of a mixed video signal $V_{m2}$.

FIGS. 14A to 14O are diagrams showing the input key signal $K_1$ to $K_4$, priority key signals $K_{p1}$ to $K_{p4}$, the mixed key signal $K_m$, the video gain control signals $K_{g1}$ to $K_{g4}$, and the mixed video signals $V_{m1}$ and $V_{m2}$, respectively.

The video signal generators 11, 12, 53, and 54 output the input key signals $K_1$ to $K_4$ (shown in FIGS. 14A to 14D), respectively, to the key signal mixer 510. The key signal mixer 510 outputs the priority key signals $K_{p1}$ to $K_{p4}$ (shown in FIGS. 14E to 14H). In Example 3, the input key signals $K_1$ to $K_4$ have higher priorities in this order when mixed. Therefore, the priority key signals $K_{p1}$ to $K_{p4}$ have waveforms whose levels are limited in accordance with the levels of the input key signals $K_1$ to $K_4$ in their order of priority. For example, the input key signal $K_1$ has a higher priority than that of the input key signal $K_2$. Therefore, the priority key signal $K_{p2}$ is limited to the zero level in regions where the input key signal $K_1$ is at the full level (i.e., 1). The priority key signal $K_{p2}$ is not limited in regions where the input key signal $K_1$ is at the zero level, so that the input key signal $K_2$ is output as the priority key signal $K_{p2}$.

The mixed key signal $K_m$ has a waveform corresponding to the summation of the priority key signals $K_{p1}$ to $K_{p4}$, as shown in FIG. 14I.

The key signal division section 520 divides the priority key signals $K_{p1}$ to $K_{p4}$ (shown in FIGS. 14E to 14H) each by the mixed key signal $K_m$ (shown in FIG. 14I). The video gain control signals $K_{g1}$ to $K_{g4}$ which are the results of division, have waveforms obtained by subjecting the priority key signals $K_{p1}$ to $K_{p4}$ to non-linear gain controls, as shown in FIGS. 14J to 14M, respectively.

Thus, the video gain control signals $K_{g1}$ to $K_{g4}$ ensure that the video signal mixer 530 generates the mixed video signal $V_{m1}$ as shown in FIG. 14N, in which the input video signal $V_1$, the input video signal $V_2$, the input video signal $V_3$. and the input video signal $V_4$ are mixed.

The video signal mixer 104 mixes the mixed video signals $V_{m1}$ and the background video signal $V_b$ in accordance with the mixed key signal $K_m$ (shown in FIG. 14I). Therefore, the mixed video signal $V_{m2}$ is a video signal in which the input video signals $V_1$ to $V_4$ are mixed and inserted into the background video signal $V_b$ as shown in FIG. 14O.

Thus, a desired video mix is achieved in the case where two input key signals are both at intermediate levels (i.e., levels larger than 0 and smaller than 1), without allowing non-linear mix characteristics to be generated due to multiple interaction of the key signals. Thus, one of the objectives of the present invention, i.e., video mix in the case where a plurality of input key signals are at intermediate levels, is achieved under the condition that the background video signal $V_b$ is led through the video signal mixer only once.

As in Example 1, in the case where the video signal mixer 104 for mixing the mixed video signal $V_{m1}$ and the background video signal $V_b$ is provided in a video switcher, the video signal mixer 104 can be omitted from the video mixing apparatus 5 in Example 3. In other words, the video mixing apparatus 5 will function sufficiently without incorporating the video signal mixer 104 as long as they are capable of outputting the mixed video signal $V_{m1}$ and the mixed key signal $K_m$.

Although a case is illustrated in FIG. 13 in which four input key signals and four input video signals are employed, a video mixing apparatus for receiving and mixing a number N (where N is an integer of 3 or more) of input key signals and N input video signals can be similarly constructed as follows: A key signal mixer receives $1^{st}$ to $N^{th}$ key signals, and generates and outputs $(N+1)^{th}$ to $2N^{th}$ key signals and a mixed key signal. Given that the $1^{st}$ to $2N^{th}$ key signals have levels $K_1$ to $K_{2N}$, respectively, $K_i = K_{i-N} \cdot (1-K_{i-N-1}) \cdot (1-K_{i-N-2}) \cdot \ldots \cdot (1-K_1)$ holds for $i=(N+1)$ to $2N$ (where $K_0=0$). Given that the mixed key signal has a level $K_m$, $K_m = 1-(1-K_1) \cdot (1-K_2) \cdot \ldots \cdot (1-K_N)$. A key signal division section receives the $(N+1)^{th}$ to $2N^{th}$ key signals and the mixed key signal, and generates and outputs $(2N+1)^{th}$ to $3N^{th}$ key signals. Given that the $(2N+1)^{th}$ to $3N^{th}$ key signals have levels $K_{2N+1}$ to $K_{3N}$, respectively, $K_i = K_{i-N}/K_m$ holds for $i=(2N+1)$ to $3N$. A video signal mixer receives the $1^{st}$ to $N^{th}$ video signals and the $(2N+1)^{th}$ to $3N^{th}$ key signals, and mixes the $1^{st}$ to $N^{th}$ video signals at a mix ratio in accordance with the $(2N+1)^{th}$ to $3N^{th}$ key signals so as to generate and output an output video signal having a level of $V_{m1}$. Specifically, given that the $1^{st}$ to $N^{th}$ video signals are at levels $V_1$ to $V_N$, respectively, $V_{m1} = V_1 \cdot K_{2N+1} + V_2 \cdot K_{2N+2} + \ldots + V_N \cdot K_{3N}$ holds.

(Example 4)

Figure 15:
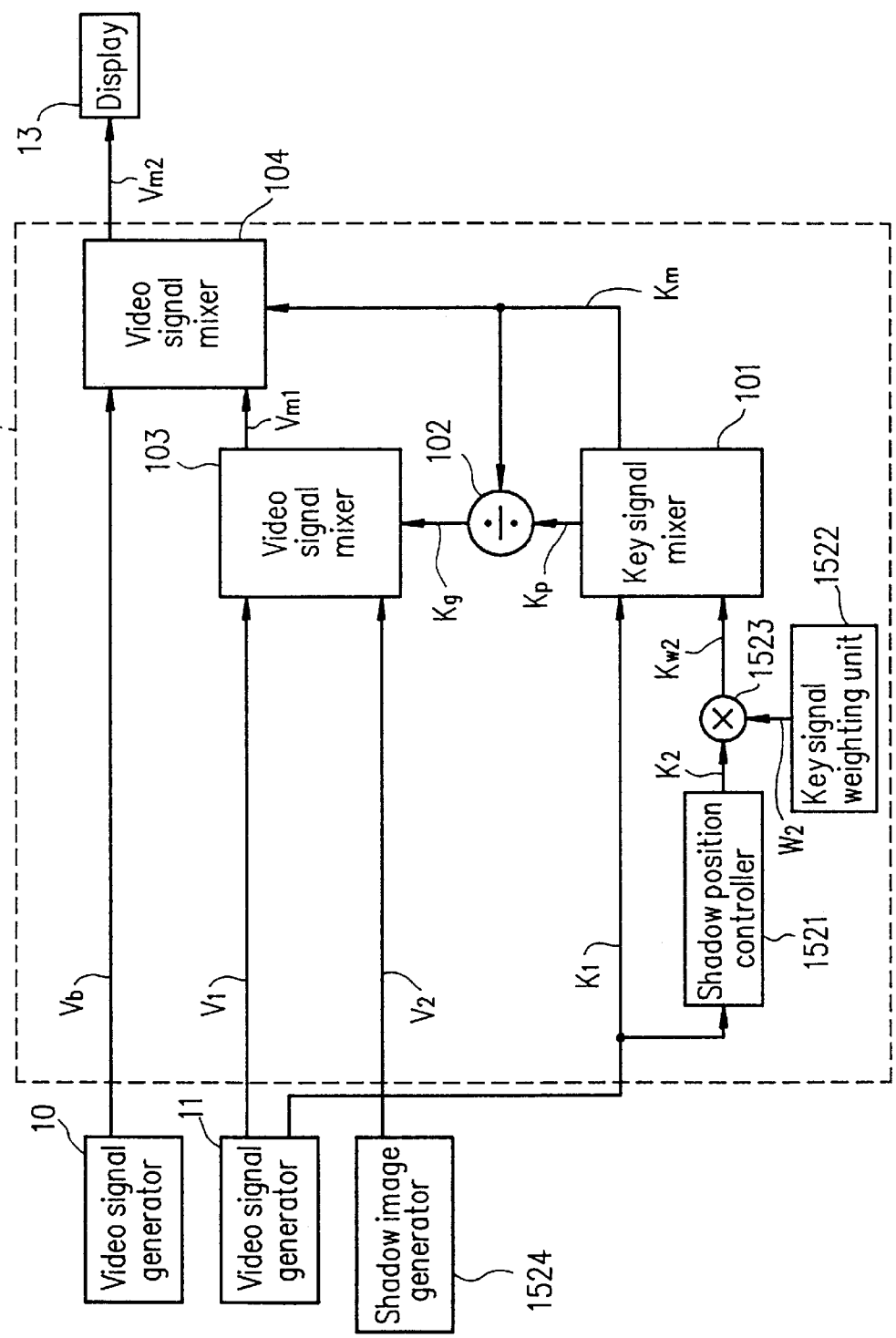
FIG. 15 is a block diagram showing a video mixing apparatus 6 according to Example 4 of the present invention.

FIG. 15 is a block diagram showing a video mixing apparatus 6 according to Example 4 of the present invention. The video mixing apparatus 6 receives an input key signal $K_1$ and an input video signal $V_1$, which are output from a video signal generator 11, and a background video signal $V_b$, which are output from a video signal generator 10, and mixes an image represented by the input video signal $V_1$, a dropshadow of that image, and the background video signal $V_b$ so as to output a mixed video signal $V_{m1}$.

A "dropshadow" is generally used for creating visual effect as if a video mix were performed three-dimensionally. For example, the dropshadow is generated by moving the input image toward right bottom corner of the screen of the display and by decreasing the luminance of the moved image. Where the input image and the dropshadow are overlapped on the screen, the input image is displayed with higher priority so as to be displayed as if the input image were positioned before the dropshadow and light were irradiated from left top corner of the screen.

The video mixing apparatus 6 includes a key signal mixer 101, a key signal division section 102, a video signal mixer 103, a video signal mixer 104, a shadow position controller 1521, a multiplier 1523, and a shadow image generator 1524.

The shadow position controller 1521 outputs a key signal $K_2$ representing the dropshadow (which determines the position of the dropshadow) by shifting the position of the input key signal $K_1$ on the display screen upward, downward, rightward, and/or leftward. In the case of a real-time video processing apparatus such as a video switcher, the shadow position controller 1521 can be realized by using a time delaying element. For an analog signal, the time delaying element is implemented by a delay line device. For a digital signal, on the contrary, the time delaying element is implemented by a first-in first-out (FIFO) type memory.

A key signal weighting unit 1522 weights the key signal $K_2$ in order to perform a weighting operation for an image representing the dropshadow generated by the shadow image generator 1524. Due to this weighting, the level of the key signal varies depending on the location on the display screen. As a result, it becomes possible to add a pattern of light and shade to the image representing the dropshadow. The multiplier 1523 multiplies the key signal $K_2$ output from the shadow position controller 1521 by a weighting pattern signal $W_2$ output from the key signal weighting unit 1522, and outputs the result of multiplication to a key signal mixer 101. The video signal mixer 103 receives the input video signals $V_1$ output from the video signal generator 11 and the input video signal $V_2$ output from the shadow image generator 1524, mixes these video signals in accordance with a video gain control signal $K_g$, and outputs the result of mix as the mixed video signal $V_{m1}$ to the video signal mixer 104.

FIG. 16A is a diagram showing a state in which an image and its dropshadow are mixed with a background image.

FIGS. 16B to 16J show the input key signals $K_1$ and $K_2$, the weighting pattern signal $W_2$, an output signal $K_{w2}$ which is output from the multiplier 1523, a priority key signal $K_p$, a mixed key signal $K_m$, the video gain control signal $K_g$, and the mixed video signals $V_{m1}$ and $V_{m2}$, respectively. The weighting pattern signal $W_2$ has a conical level distribution inside each shaded circular region in FIG. 16A, but is at the zero level outside each region. The multiplier 1523 multiplies the key signal $K_2$ (shown in FIG. 16C) output from the shadow position controller 1521 by the weighting pattern signal $W_2$ (shown in FIG. 16D). As a result, the output signal $K_{w2}$ of the multiplier 1523 is trimmed so that only in a region where the dropshadow exists the weighting pattern signal $W_2$ is output, as shown in FIG. 16E.

As for the mixed video signal $V_{m1}$, which is output from the video signal mixer 103, the video signal $V_2$ of the dropshadow output from the shadow image generator 1524 is output in the dropshadow region, and the input video signal $V_1$ is output in regions other than the dropshadow region, as shown in FIG. 16I. The mixed video signal $V_{m2}$ (shown in FIG. 16J) output from the video signal mixer 104 is a video signal in which the input video signal $V_1$ and the video signal $V_2$ of the dropshadow are mixed with the background video signal $V_b$. By inputting the output signal $K_{w2}$ to the key signal mixer 101 as a key signal (the output signal $K_{w2}$ being obtained by multiplying the key signal $K_2$ which is output from the shadow position controller 1521 by the weighting pattern signal $W_2$), it becomes possible to modify the level of the input video signal $V_2$ with the weighting pattern signal $W_2$ before mixing the input video signal $V_2$ with other video signals.

In the present example, the video signal $V_2$ of the dropshadow (output from the shadow image generator 1524) is employed as one of the video signals to be input to the video signal mixer 103, and a key signal (i.e., $K_2$) which is obtained by shifting the input key signal $K_1$ on the display screen by use of the shadow position controller 1521 is multiplied by the weighting pattern signal $W_2$. However, the same effect can also be attained in the case where the two video signals to be mixed in the video signal mixer 103 are both externally supplied and the key signal to be multiplied by the weighting pattern signal $W_2$ is also externally supplied, that is, in the case where input video signals $V_1$ and $V_2$ are input to the video signal mixer 103 and an input key signal $K_1$ corresponding to the input video signal $V_1$ and $V_2$ is input to the key signal mixer 101, an input key signal $K_2$ corresponding to the input video signal $V_2$ being multiplied by the weighting pattern signal at the multiplier 1523.

Although Example 4 described a case where the weighting pattern signal $W_2$ output from the key signal weighting unit 1522 is a signal whose level varies depending on the location on the display screen, the same effect can also be attained in the case where the weighting pattern signal $W_2$ has a constant level regardless of the location.

The key signal weighting unit 1522 and the multiplier 1523 are provided for one of the input key signals to the key signal mixer 101, i.e., $K_2$, in Example 4. In the case where a key signal weighting unit and a multiplier are also provided for the other input key signal $K_1$ in a similar manner (i.e., so that a key signal weighting unit and a multiplier are provided for the key signals $K_1$ and $K_2$ each), the above-mentioned effect of modifying the video signal level of the video signal $V_2$ can also be attained for the video signal $V_1$.

As in Example 1, in the case where the video signal mixer 104 for mixing the mixed video signal $V_{m1}$ and the background video signal $V_b$ is provided in a video switcher, the video signal mixer 104 can be omitted from the video mixing apparatus 6. In other words, the video mixing apparatus 6 will function sufficiently without incorporating the video signal mixer 104 as long as they are capable of outputting the mixed video signal $V_{m1}$ and the mixed key signal $K_m$.

(Example 5)

Figure 17:
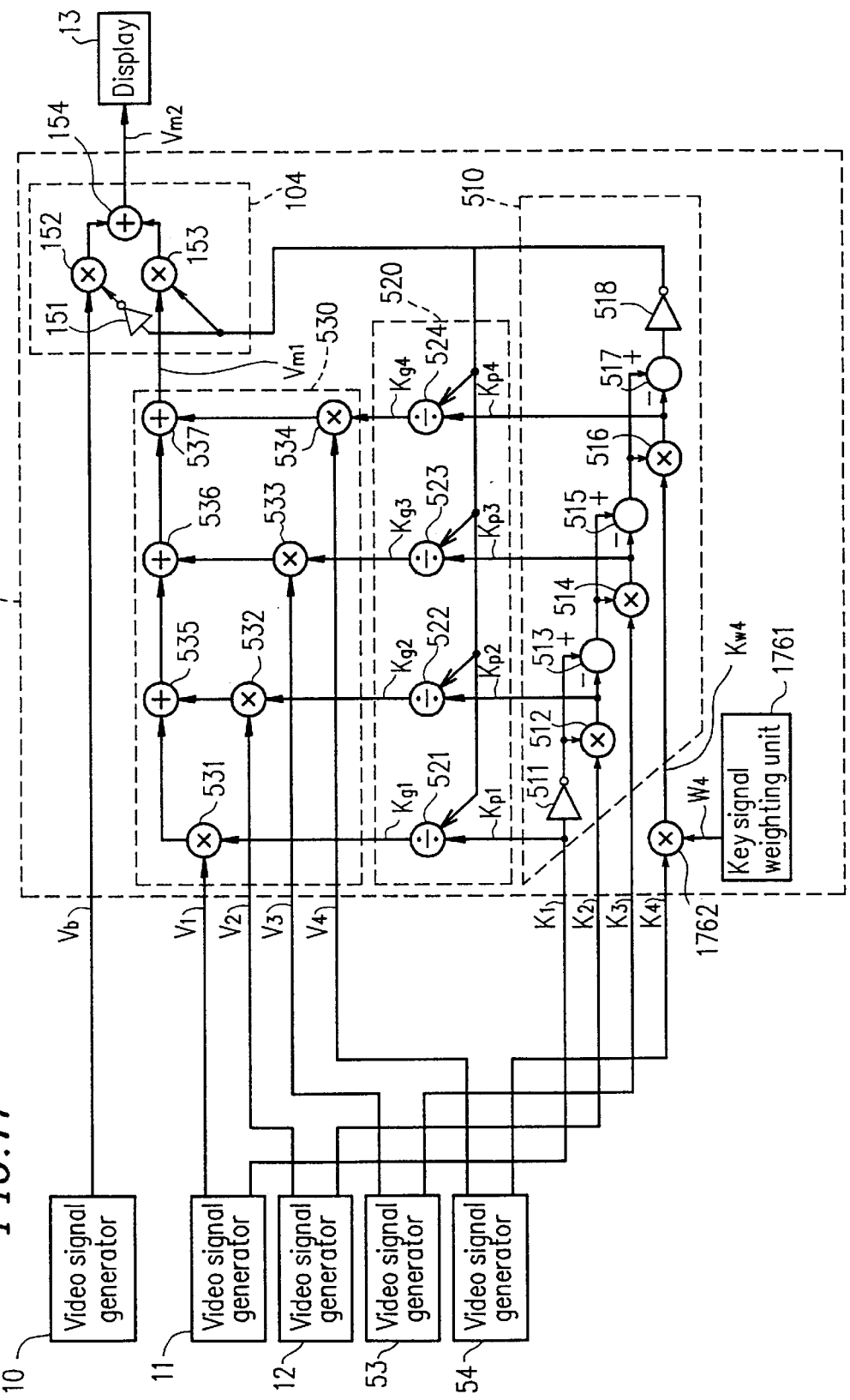
FIG. 17 is a block diagram showing a video mixing apparatus 7 according to Example 5 of the present invention.

FIG. 17 is a block diagram showing a video mixing apparatus 7 according to Example 5 of the present invention. The video mixing apparatus 7 has the same configuration as that of the video mixing apparatus 5 of Example 3 except that the video mixing apparatus 7 includes a key signal weighting unit 1761 and a multiplier 1762.

FIGS. 18A to 18P show the input key signals $K_i$ to $K_4$, the weighting pattern signal $K_{w4}$, priority key signals $K_{p1}$ to $K_{p4}$, a mixed key signal $K_m$, video gain control signals $K_{g1}$ to $K_{g4}$, and mixed video signals $V_{m1}$ and $V_{m2}$, respectively.

The key signal mixer 510 receives the key signals shown in FIGS. 18A to 18C. The key signal weighting unit 1761 outputs a weighting pattern signal $W_4$ which is at a 50% level (i.e., 0.5) of the full level (i.e., 1.0) regardless of the location on the display screen. The multiplier 1762 multiplies the input key signal $K_4$ (shown in FIG. 18D) by the weighting pattern signal $W_4$, and outputs the result of multiplication as the key signal $K_{w4}$ (shown in FIG. 18E) to the key signal mixer 510. The key signal mixer 510 receives the input key signals $K_1$ to $K_3$ and $K_{w4}$, and outputs the priority key signals $K_{p1}$ to $K_{p4}$ (shown in FIGS. 18F to 18I) to the signal division section 520. The priority key signals $K_{p1}$ to $K_{p4}$ are controlled so that their levels are limited in accordance with the levels of the input key signal $K_1$ to $K_4$ in their order of priorities. Herein, the input key signals $K_1$ to $K_4$ have higher priorities in this order. The mixed key signal $K_m$ has a waveform corresponding to the summation of the priority key signals $K_{p1}$, $K_{p2}$, $K_{p3}$, and $K_{p4}$, as shown in FIG. 18I.

The input key signal which has a higher priority than that of the input key signal $K_1$ is the input key signal $K_2$. Therefore, the priority key signal $K_{p2}$ is limited to the zero level in regions where the input key signal $K_1$ is at the full level (i.e., 1.0). The priority key signal $K_{p2}$ is not limited in regions where the input key signal $K_1$ is at the zero level, so that the input key signal $K_2$ is output as the priority key signal $K_{p2}$.

The key signal division section 520 divides the priority key signals $K_{p1}$ to $K_{p4}$ each by the mixed key signal $K_m$. Therefore, the video gain control signals $K_{g1}$ to $K_{g4}$, which are the respective results of division, have waveforms obtained by subjecting the priority key signals $K_{p1}$ to $K_{p4}$ to non-linear gain controls, as shown in FIGS. 18K to 18N, respectively. Thus, the video gain control signals $K_{g1}$ to $K_{g4}$ ensure that the video signal mixer 530 generates the mixed video signal $V_{m1}$ as shown in FIG. 18O, in which the input video signal $V_1$, the input video signal $V_2$, the input video signal $V_3$, and the input video signal $V_4$ are mixed.

The video signal mixer 104 mixes the mixed video signals $V_{m2}$ and the background video signal $V_b$ in accordance with the mixed key signal $K_m$. Therefore, the mixed video signal $V_{m2}$ is a video signal in which the input video signals $V_1$ to $V_4$ are inserted into the background video signal $V_b$, as shown in FIG. 18P. Thus, a linear mix is achieved even in the case where two input key signals are both at intermediate levels, without allowing square characteristics to be generated due to multiple interaction of the key signals.

Thus, one of the objectives of the present invention, i.e., video mix in the case where a plurality of input key signals are at intermediate levels, is achieved under the condition that the background video signal $V_b$ is led through the video signal mixer only once.

The key signal weighting unit 1761 and the multiplier 1762 are provided only for the input key signal $K_4$ in Example 5. However, it is also applicable to provide a key signal weighting unit and a multiplier for the other input key signals $K_1$, $K_2$, and $K_3$ in a similar manner. In this case, the above-mentioned effect of modifying the video signal level of the input video signal $V_4$ (illustrated in Example 5) can also be attained for the input video signals $V_1$, $V_2$, and $V_3$, respectively.

As in Example 1, in the case where the video signal mixer 104 for mixing the mixed video signal $V_{m1}$ and the background video signal $V_b$ is provided in a video switcher, the video signal mixer 104 can be omitted from the video mixing apparatus 7. In other words, the video mixing apparatus 7 will function sufficiently without incorporating the video signal mixer 104 as long as they are capable of outputting the mixed video signal $V_{m1}$ and the mixed key signal $K_m$.

In the above-described Examples 1 to 5, the video signal generator which generates both a video signal and a key signal (e.g. video signal generators 11 and 12 in the Example 1) can be, for example, a character/graphic generator, a chromakey device, or a computer graphics device. On the other hand, the video signal generator which generates a video signal only (e.g. video signal generators 10 in the Example 1) can be, for example, a video cassette recorder, or a video camera.

In the above-described Examples 1 to 5, the background video signal $V_b$ only needs to be a video signal; for example, the background video signal $V_b$ can be an output video signal of an imaging apparatus or an output video signal of a video switcher. The input key signals and the input video signals are merely required to be a combination of key signals and video signals; for example, they can be output key signals of a flying spot apparatus and output video signals of a video signal recording apparatus. The mix priority key signal $P_r$ only needs to be a signal representing the mixing ratio of video mix; for example, the mix priority key signal $P_r$ can be an output key signal of a chromakey apparatus, instead of an output of a wipe waveform generator. Furthermore, the mixed video signal $V_{m2}$ allows general use as a video signal, instead of being displayed by a display apparatus; for example, the mixed video signal $V_{m2}$ can be recorded by a video signal recording apparatus or input to a video mixing apparatus for performing further mixing processes.

It is also applicable to employ the key signal weighting units described in Examples 4 and 5 in Examples 1 to 3. For example, in Example 1 (illustrated in FIG. 1), an output signal $K_{v2}$ can be supplied to the key signal mixer 101, instead of the input key signal $K_2$ output from the video signal generator 12.

The adders, subtracters, multipliers, and dividers in Examples 1 to 5 can be realized by using analog circuits or digital circuits. When they are implemented by digital circuits, the desired operations can be performed for key signals and video signals which have been converted into digital signals from analog signals. In such cases, it is applicable to employ a digital signal processor (DSP), for example, for high-precision and high-speed operations.

The internal structures of the key signal mixers and video signal mixers shown in FIGS. 2, 3, 6, 7, 9, 12, and 13 are not limited to those which are shown these figures. The adders, multipliers, etc. in the respective internal structures admit variations as long as the mixer shown in each figure provides the desired signal.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video mixing apparatus for mixing a first video signal and a second video signal in accordance with a first key signal and a second key signal, the video mixing apparatus comprising:

a key signal mixer for receiving the first and second key signals and generating and outputting a third key signal and a fourth key signal, wherein a level $K_1$ of the first key signal, a level $K_2$ of the second key signal, a level $K_p$ of the third key signal, and a level $K_m$ of the fourth key signal satisfy the relationships:

$$K_p = K_2 - K_1 K_2,$$

and $$K_m = K_1 + K_2 - K_1 K_2;$$

a key signal division section for receiving the third and fourth key signals and generating and outputting a fifth key signal, wherein a level $K_g$ of the fifth key signal satisfies the relationship:

$$K_g = K_p / K_m;$$

and a first video signal mixer for receiving the first and second video signals and the fifth key signal and generating and outputting a third video signal by mixing the first and second video signals at a mix ratio which is in accordance with the fifth key signal.

2. A video mixing apparatus according to claim 1, wherein a level $V_1$ of the first video signal, a level $V_2$ of the second video signal, and a level $V_{m1}$ of the third video signal satisfy the relationship:

$$V_{m1} = (1 - K_g) V_1 + K_g \cdot V_2.$$

3. A video mixing apparatus according to claim 1 further comprising a second video signal mixer for receiving the third and fourth video signals and the fourth key signal and generating and outputting a fifth video signal by mixing the third and fourth video signals at a mix ratio which is in accordance with the fourth key signal.

4. A video mixing apparatus according to claim 3, wherein a level $V_{m1}$ of the third video signal, a level $V_b$ of the fourth video signal and a level $V_{m2}$ of the fifth video signal satisfy the relationship:

$$V_{m2} = (1 - K_m) V_b + K_m \cdot V_{m1}.$$

5. A video mixing apparatus according to claim 1 further comprising a key signal division section for receiving a first priority key signal $K_{p1}$ and the fourth key signal and generating and outputting a sixth key signal, wherein a level $K_{g1}$ of the sixth key signal satisfies the relationship:

$$K_{g1} = K_{p1} / K_m,$$

and the first video signal mixer further receives the sixth key signal and generates and outputs a third video signal by mixing the first and second video signals at a mix ratio which is in accordance with the fifth and sixth key signals.

6. A video mixing apparatus according to claim 5, wherein a level $K_{g2}$ of the fifth key signal, a level $V_1$ of the first video signal, a level $V_2$ of the second video signal, and a level $V_{m1}$ of the third video signal satisfy the relationship:

$$V_{m1}=K_{g1} \cdot V_1 + K_{g2} \cdot V_2.$$

7. A video mixing apparatus for mixing a first video signal and a second video signal in accordance with a first key signal, a second key signal, and a priority key signal, the video mixing apparatus comprising:

a key signal mixer for receiving the first key signal, the second key signal, and the priority key signal and generating and outputting a third key signal and a fourth key signal, wherein a level $K_1$ of the first key signal, a level $K_2$ of the second key signal, a level $K_p$ of the third key signal, a level $K_m$ of the fourth key signal, and a level $P_r$ of the priority key signal satisfy the relationships:

$$K_p = P_r K_1 K_2,$$

and $$K_m = K_1 + K_2 - K_1 K_2;$$

a key signal division section for receiving the third and fourth key signals and generating and outputting a fifth key signal, wherein a level $K_g$ of the fifth key signal satisfies the relationship:

$$K_g = K_p K_m;$$

and a first video signal mixer for receiving the first and second video signals and the fifth key signal and generating and outputting a third video signal by mixing the first and second video signals at a mix ratio which is in accordance with the fifth key signal.

8. A video mixing apparatus according to claim 7, wherein a level $V_1$ of the first video signal, a level $V_2$ of the second video signal, and a level $V_{m1}$ of the third video signal satisfy the relationship:

$$V_{m1}=(1-K_g)V_1 + K_g \cdot V_2.$$

9. A video mixing apparatus according to claim 7 further comprising a second video signal mixer for receiving the third and fourth video signals and the fourth key signal and generating and outputting a fifth video signal by mixing the third and fourth video signals at a mix ratio which is in accordance with the fourth key signal.

10. A video mixing apparatus according to claim 9, wherein a level $V_{m1}$ of the third video signal, a level $V_b$ of the fourth video signal and a level $V_{m2}$ of the fifth video signal satisfy the relationship:

$$V_{m2}=(1-K_m)V_b + K_m \cdot V_{m1}.$$

11. A video mixing apparatus according to claim 7 further comprising a key signal division section for receiving a first priority key signal $K_{p1}$ and the fourth key signal and generating and outputting a sixth key signal, wherein a level $K_{g1}$ of the sixth key signal satisfies the relationship:

$$K_{g1}=K_{p1}/K_m;$$

and the first video signal mixer further receives the sixth key signal and generates and outputs a third video signal by mixing the first and second video signals at a mix ratio which is in accordance with the fifth and sixth key signals.

12. A video mixing apparatus according to claim 11, wherein a level $K_{g2}$ of the fifth key signal, a level $V_1$ of the first video signal, a level $V_2$ of the second video signal, and a level $V_{m1}$ of the third video signal satisfy the relationship:

$$V_{m1}=K_{g1} \cdot V_1 + K_{g2} \cdot V_2.$$

13. A video mixing apparatus for mixing $1^{st}$ to $N^{th}$ video signals in accordance with $1^{st}$ to $N^{th}$ key signals, the video mixing apparatus comprising:

a key signal mixer for receiving the $1^{st}$ to $N^{th}$ key signals and generating and outputting a $(N+1)^{th}$ to $2N^{th}$ key signals and a mixed key signal, wherein a level $K_1$ of the $1^{st}$ key signal, a level $K_2$ of the $2^{nd}$ key signal, ..., and a level $K_{2N}$ of the $2N^{th}$ key signal satisfy the relationship:

$$K_i = K_{i-N} \cdot (1-K_{i-N-1}) \cdot (1-K_{i-N-2}) \cdots (1-K_1)$$

for i=(N+1) to 2N (where $K_0$=0), and a level $K_m$ of the mixed key signal satisfies the relationship:

$$K_m = 1-(1-K_1)\cdot(1-K_2)\cdots(1-K_N);$$

a key signal division section for receiving the $(N+1)^{th}$ to $2N^{th}$ key signals and the mixed key signal and generating and outputting $(2N+1)^{th}$ to $3N^{th}$ key signals, wherein a level $K_{2N+1}$ of the $(2N+1)^{th}$ key signal, a level $K_{2N+2}$ of the $(2N+2)^{th}$ key signal, ..., and a level $K_{3N}$ of the $3N^{th}$ key signal satisfy the relationship:

$$K_i = K_{i-N}/K_m$$

for i=(2N+1) to 3N; and a first video signal mixer for receiving the $1^{st}$ to $N^{th}$ video signals and the $(2N+1)^{th}$ to $3N^{th}$ key signals and generating and outputting a first output video signal by mixing the $1^{st}$ to $N^{th}$ video signals at a mix ratio which is in accordance with the $(2N+1)^{th}$ to $3N^{th}$ key signals, wherein N is an integer equal to or greater than two.

14. A video mixing apparatus according to claim 13, wherein a level $V_1$ of the $1^{st}$ video signal, a level $V_2$ of the $2^{nd}$ video signal, ..., and a level $V_N$ of the $N^{th}$ video signal satisfy the relationship:

$$V_{m1}=V_1 \cdot (K_{2N+1}) + V_2 \cdot (K_{2N+2}) + \ldots + V_3 \cdot (K_{3N}).$$

15. A video mixing apparatus according to claim 13 further comprising a second video signal mixer for receiving the first output video signal, the $(N+1)^{th}$ video signal, and the mixed key signal and generating and outputting a second output video signal by mixing the first output video signal and the $(N+1)^{th}$ video signal at a mix ratio which is in accordance with the mixed key signal, wherein N is an integer equal to or greater than three.

16. A video mixing apparatus according to claim 15, wherein a level $V_{N+1}$ of the $(N+1)^{th}$ video signal and a level $V_{m2}$ of the second video signal satisfy the relationship:

$$V_{m2}=K_m \cdot V_{m1} + (1-K_m) \cdot V_{N+1}.$$

17. A video mixing apparatus according to claim 1 further comprising a key signal weighting unit for varying at least one of the key signals depending on a display location on a display, wherein the key signal mixer receives at least one of the weighted key signals output from the key signal weighting unit.

18. A video mixing apparatus according to claim 7 further comprising a key signal weighting unit for varying at least one of the key signals depending on a display location on a display, wherein the key signal mixer receives at least one of the weighted key signals output from the key signal weighting unit.

19. A video mixing apparatus according to claim 13 further comprising a key signal weighting unit for varying at least one of the key signals depending on a display location on a display, wherein the key signal mixer receives at least one of the weighted key signals output from the key signal weighting unit.

* * * * *

UNITED STATES PATENT AND TRADE MARK OFFICE
CERTIFICATE OF CORRECTION

PATENT NO.   : 5,825,433
DATED        : October 20, 1998
INVENTOR(S)  : Yamada et al.

It is certified that error appears in the above-identified patent and that said Letters Patent is hereby corrected as shown below:

Column 23, line 25, delete "$K_p - P_r K_{1J_2}$," and insert --$K_p = K_2 - P_r K_1 K_2$,--.

Signed and Sealed this

Eighteenth Day of May, 1999

Attest:

Q. TODD DICKINSON

*Attesting Officer*   Acting Commissioner of Patents and Trademarks